(12) United States Patent
Caligor

(10) Patent No.: US 11,074,523 B2
(45) Date of Patent: Jul. 27, 2021

(54) CALENDAR BASED TASK AND TIME MANAGEMENT SYSTEMS AND METHODS

(71) Applicant: Dan Caligor, New York, NY (US)

(72) Inventor: Dan Caligor, New York, NY (US)

(*) Notice: Subject to any disclaimer, the term of this patent is extended or adjusted under 35 U.S.C. 154(b) by 0 days.

(21) Appl. No.: 16/420,508

(22) Filed: May 23, 2019

(65) Prior Publication Data
US 2019/0279116 A1 Sep. 12, 2019

Related U.S. Application Data

(60) Division of application No. 15/601,927, filed on May 22, 2017, now abandoned, which is a continuation of application No. 13/421,595, filed on Mar. 15, 2012, now Pat. No. 9,659,260.

(60) Provisional application No. 61/452,828, filed on Mar. 15, 2011.

(51) Int. Cl.
*G06Q 10/00* (2012.01)
(52) U.S. Cl.
CPC .................... *G06Q 10/00* (2013.01)
(58) Field of Classification Search
CPC ......... G06Q 10/00; G06Q 40/06; G06A 40/00
USPC ........................................................ 705/7.21
See application file for complete search history.

(56) References Cited

U.S. PATENT DOCUMENTS

| | | |
|---|---|---|
| 5,692,125 A | 11/1997 | Schloss |
| 5,787,000 A | 7/1998 | Lilly et al. |
| 5,899,979 A | 5/1999 | Miller et al. |
| 5,902,352 A * | 5/1999 | Chou ............... G06F 9/4881 718/100 |
| 6,047,260 A | 4/2000 | Levinson |
| 6,442,527 B1 | 8/2002 | Worthington |
| 6,732,080 B1 | 5/2004 | Blants |
| 6,760,728 B1 | 7/2004 | Osborn |
| 6,850,895 B2 | 2/2005 | Brodersen et al. |
| 6,954,737 B2 * | 10/2005 | Kalantar ......... G06Q 10/06311 705/50 |
| 7,171,375 B2 | 1/2007 | Clarke |
| 7,346,531 B2 | 3/2008 | Jacobs |
| 7,370,282 B2 | 5/2008 | Cary |
| 7,441,194 B2 | 10/2008 | Vronay et al. |
| 7,457,773 B2 | 11/2008 | Schmidt et al. |
| 7,467,355 B1 | 12/2008 | Zukowski et al. |
| 7,747,966 B2 | 6/2010 | Leukart et al. |
| 7,809,599 B2 | 10/2010 | Andrew et al. |

(Continued)

*Primary Examiner* — Romain Jeanty
(74) *Attorney, Agent, or Firm* — Charles A. Rattner

(57) ABSTRACT

A software solution for managing, sorting and ranking lists of tasks and integrating task and time management, such that tasks can be automatically or manually assigned to specified time blocks. Users can monitor the relationship between volume of tasks and available time in which to complete them. The solution and method can be applied to individual task lists as well as to the management of time across multiple projects and can be employed either by individuals or by collaborative groups. The solution and method employ multiple filters, sorts and handling rules to embody users' personal planning preferences. It can be used to manage task lists both with and without employing a scheduling component. The solution can interoperate with existing computer- and web-based calendar software and can use third-party calendar clients to display its output and to accept input from users.

8 Claims, 18 Drawing Sheets

(56) References Cited

U.S. PATENT DOCUMENTS

| | | | |
|---|---|---|---|
| 7,853,572 B2* | 12/2010 | Lundberg | G06Q 10/00 707/687 |
| 7,904,321 B2 | 3/2011 | Moore et al. | |
| 7,925,527 B1* | 4/2011 | Flam | G06Q 10/00 705/7.26 |
| 7,969,922 B2 | 6/2011 | Fok et al. | |
| 8,108,436 B2 | 1/2012 | Chhatrapati et al. | |
| 8,296,170 B2* | 10/2012 | O'Brien | G06Q 10/0631 705/7.12 |
| 8,346,229 B2 | 1/2013 | Scott | |
| 8,538,064 B2 | 9/2013 | Rhoads et al. | |
| 8,645,175 B1* | 2/2014 | Arbogast | G06Q 10/06 705/7.11 |
| 9,135,071 B2* | 9/2015 | Simitsis | G06F 9/5027 |
| 9,524,355 B2 | 12/2016 | Forbes et al. | |
| 2002/0006570 A1 | 5/2002 | Wada et al. | |
| 2006/0190391 A1* | 8/2006 | Cullen, III | G06Q 10/10 705/37 |
| 2006/0027122 A1 | 11/2006 | Lilly et al. | |
| 2006/0027748 A1 | 12/2006 | Poulsen et al. | |
| 2007/0016290 A1 | 7/2007 | Herlocker et al. | |
| 2008/0002831 A1 | 1/2008 | Castelli et al. | |
| 2008/0009178 A1 | 4/2008 | Jakobson | |
| 2009/0282125 A1 | 11/2009 | Jeide et al. | |
| 2009/0029981 A1 | 12/2009 | Jardine et al. | |
| 2010/0008814 A1 | 4/2010 | Platt et al. | |
| 2010/0033227 A1 | 12/2010 | Stern et al. | |
| 2012/0001151 A1 | 1/2012 | Horvitz et al. | |
| 2012/0007940 A1 | 3/2012 | Rohwer | |
| 2012/0020358 A1 | 8/2012 | Eggena et al. | |

* cited by examiner

*Figure 2.1*

Manage Your Tasks

Name:

Description:

Special (Note): Yes ○ No ● 216

Completed: Yes ○ No ●

Priority: [none / n/a ⇅]

Category: [Inbox ⇅]

Duration: 0 : 20  212

Schedule Type: Day/Time ○   Day ●   Week ○   ASAP ○

214

Day: 211

Deadline: 215

[Reset Form] [Create Task]

*Figure 2.2*

Manage Your Tasks

Intro paragraph here. ...you can also create a new task.

Filter 1 ["test"]: (11 tasks totaling 3:00) — delete

- Name: test
- Priority: none / n/a ○  Low ○  Medium ○  High ○
- Completed: False
- Special: False
- Do: after or on ___ and/or before or on ___
- Duration: greater than or equal to ___ and/or less than or equal to ___ minutes
- Deadline: after or on ___ and/or before or on ___
- 231 Category:
  - Inbox ○      BAN ○       BIG ROCKS ○
  - INBOX ○     Keep Track Of ○   SoundStreak ○
  - SS Feature ○  TaskTime ○    TEST ○
  - TT Feature ○  Waiting For ☑  SS Launch ○
  - SS Outreach ○
- Schedule Type: Day/Time ○  Day ○  Week ○  ASAP ○

233 Order By: [Do On] [ASC] then [n/a (task creation date/time)] [ASC]

[Reset Filters] [Insert/Update Filters]

| 232 Status | Task | Category | Duration | Do | Deadline | Priority | Special | Created | Actions |
|---|---|---|---|---|---|---|---|---|---|
| | Private information not shown | Waiting For | 0:20 | ASAP | 1/11/12 | High | n/a | 12/2/01 | |
| | | Waiting For | 0:20 | ASAP | 1/11/12 | High | n/a | 1/24/12 | |
| | | Waiting For | 0:20 | ASAP | 1/11/12 | n/a | n/a | 1/4/12 | |
| | | Waiting For | 0:20 | ASAP | 1/11/12 | n/a | n/a | 1/4/12 | |
| | | Waiting For | 0:20 | ASAP | 1/12/12 | n/a | n/a | 1/5/12 | |

Figure 2.3

Figure 2.4
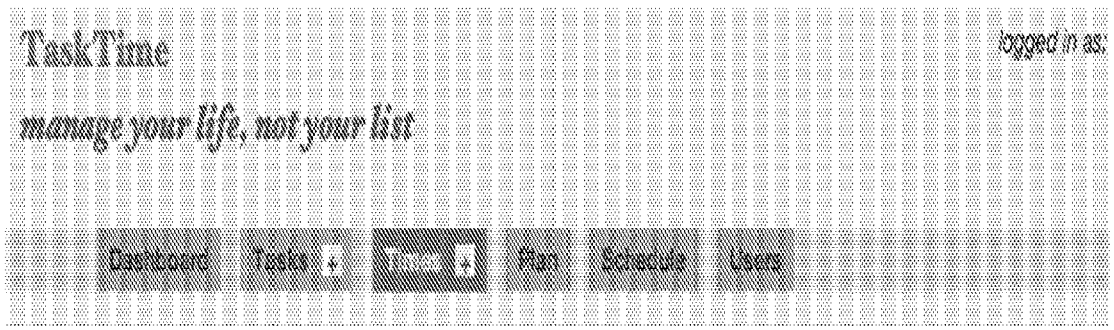

Figure 2.5
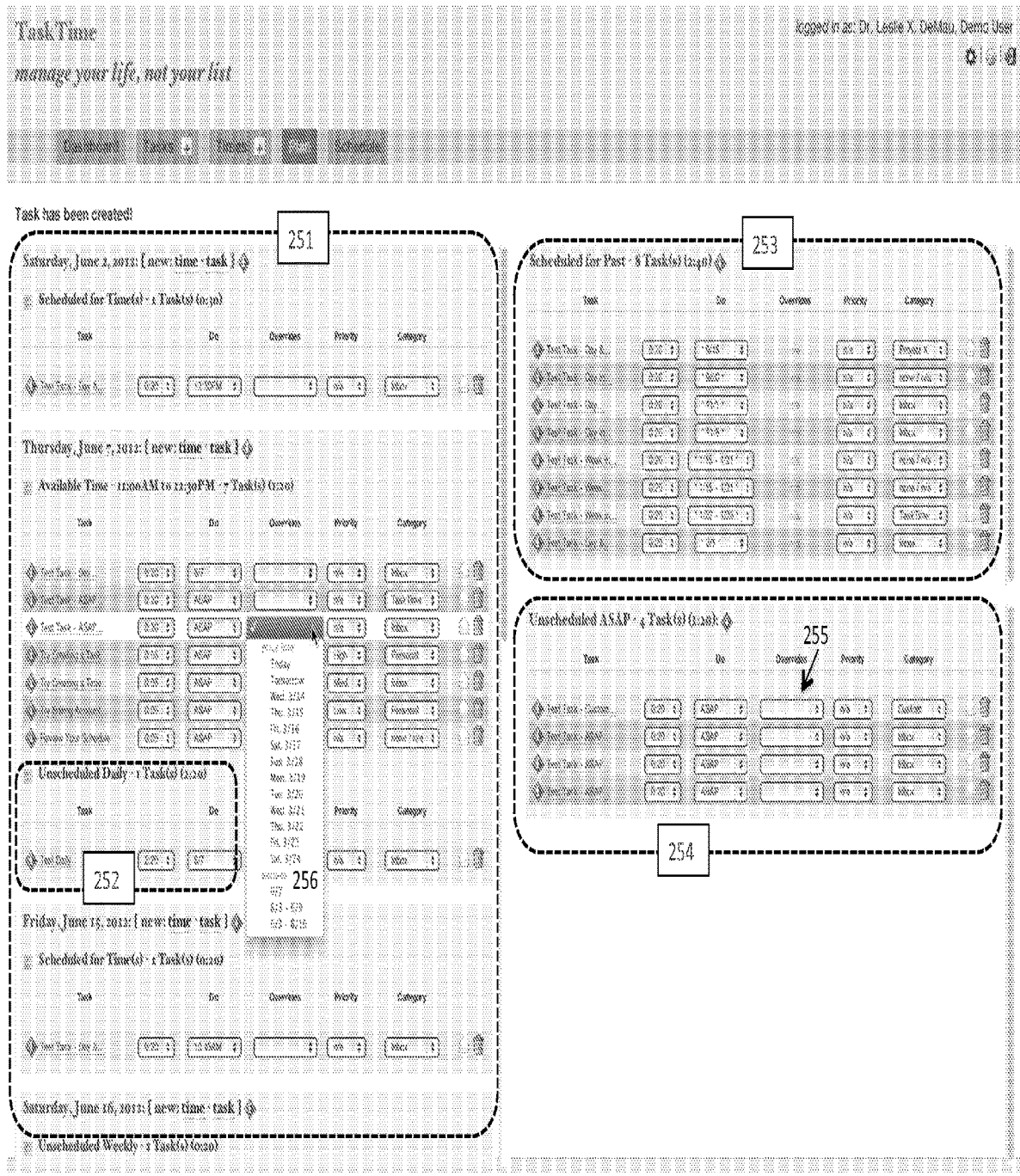

Fig 3.1
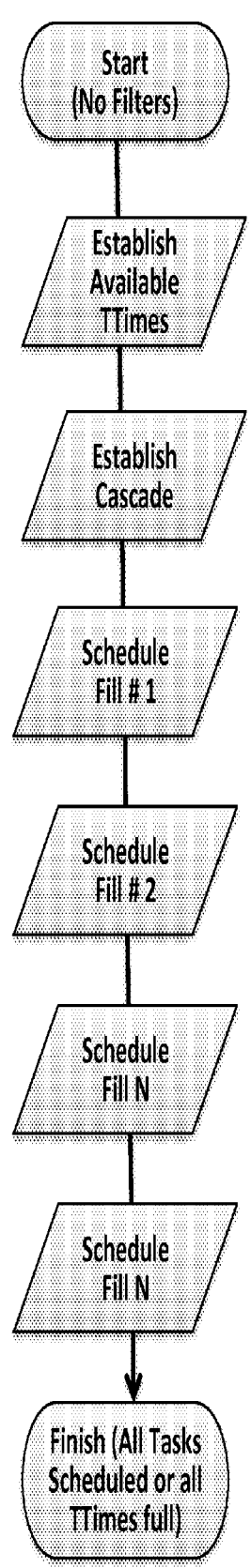
See Figure 3.2: Available TTimes Flow
See Figure 3.3: Cascade Flow
See Figure 3.4: Time-Specific Scheduling Flow
See Figure 3.5: Day-Specific Scheduling Flow
See Figure 3.6: Week-Specific Scheduling Flow
See Figure 3.7: ASAP Scheduling Flow

*Fig 3.2*
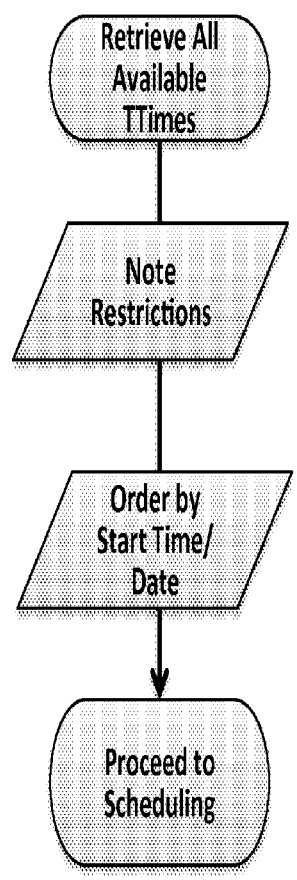

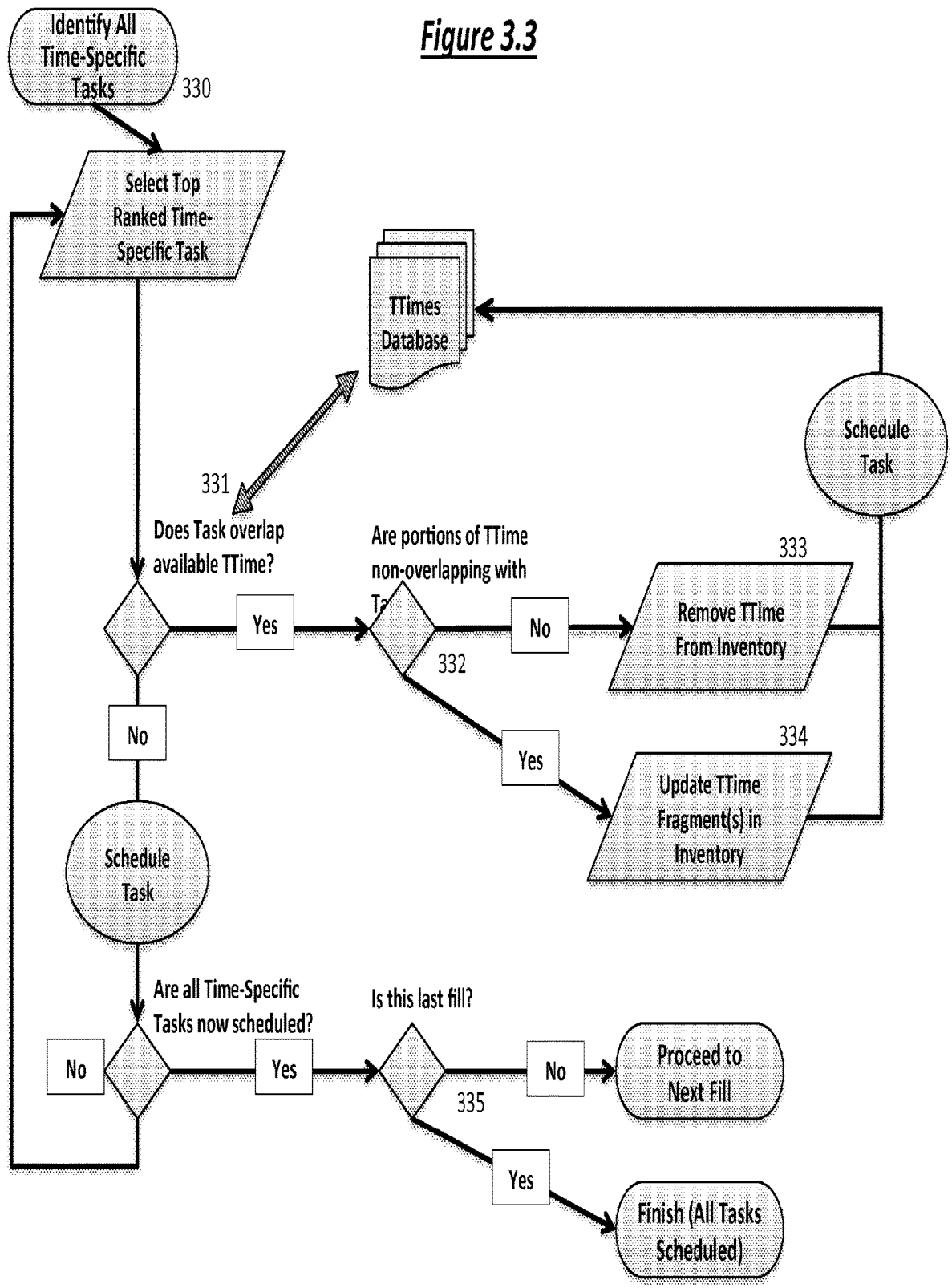
Figure 3.3

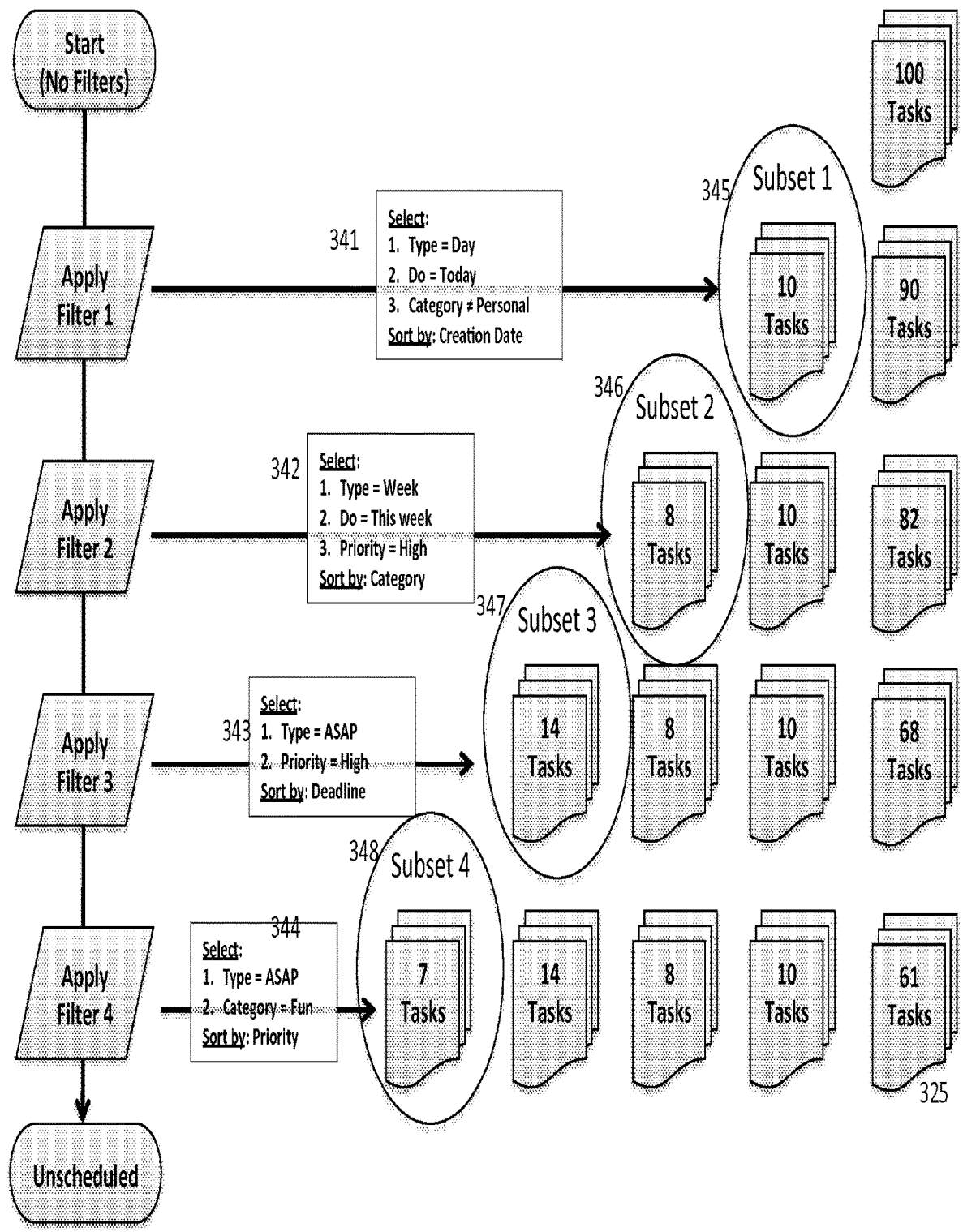
Fig 3.4

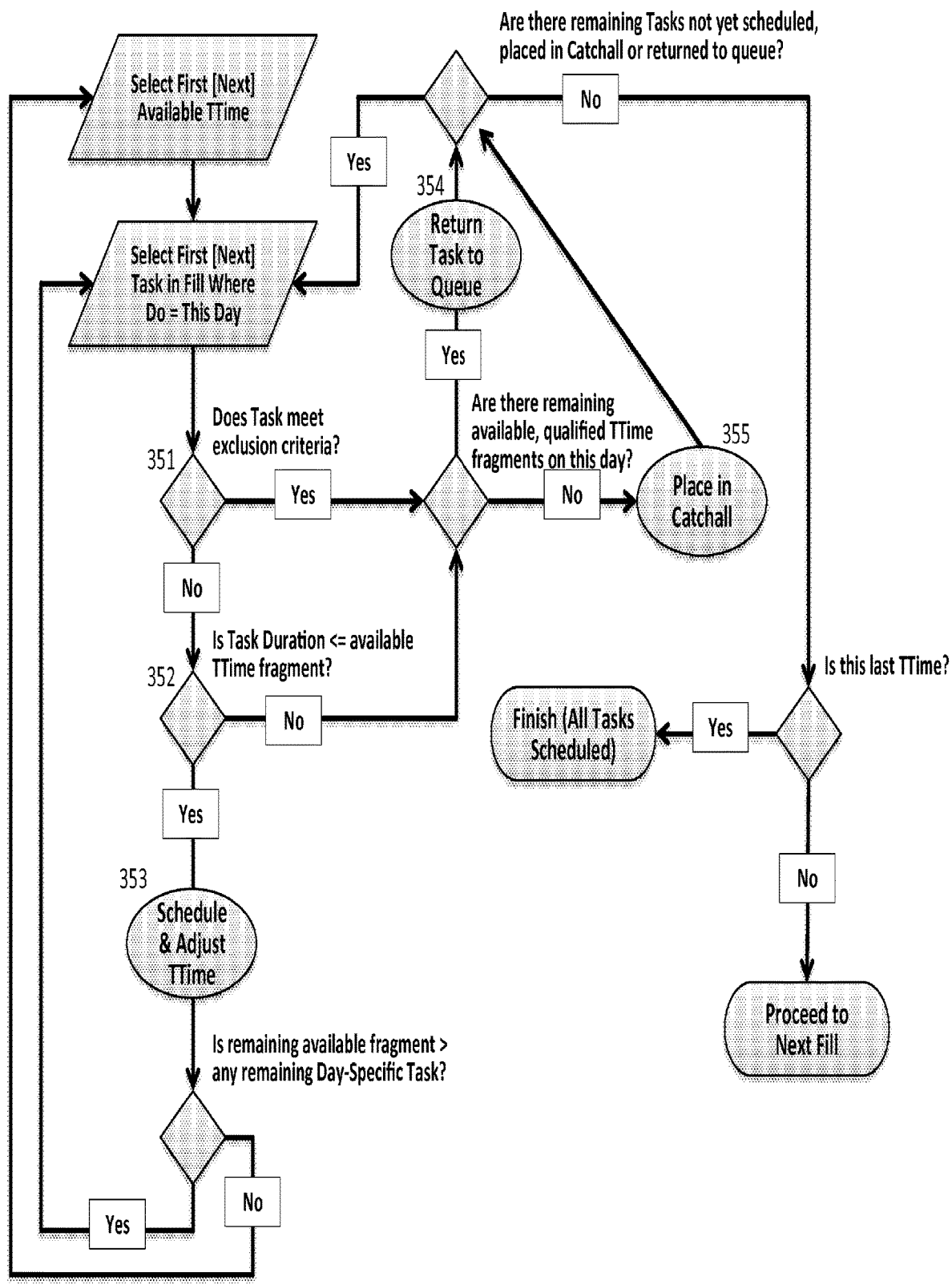
*Figure 3.5*

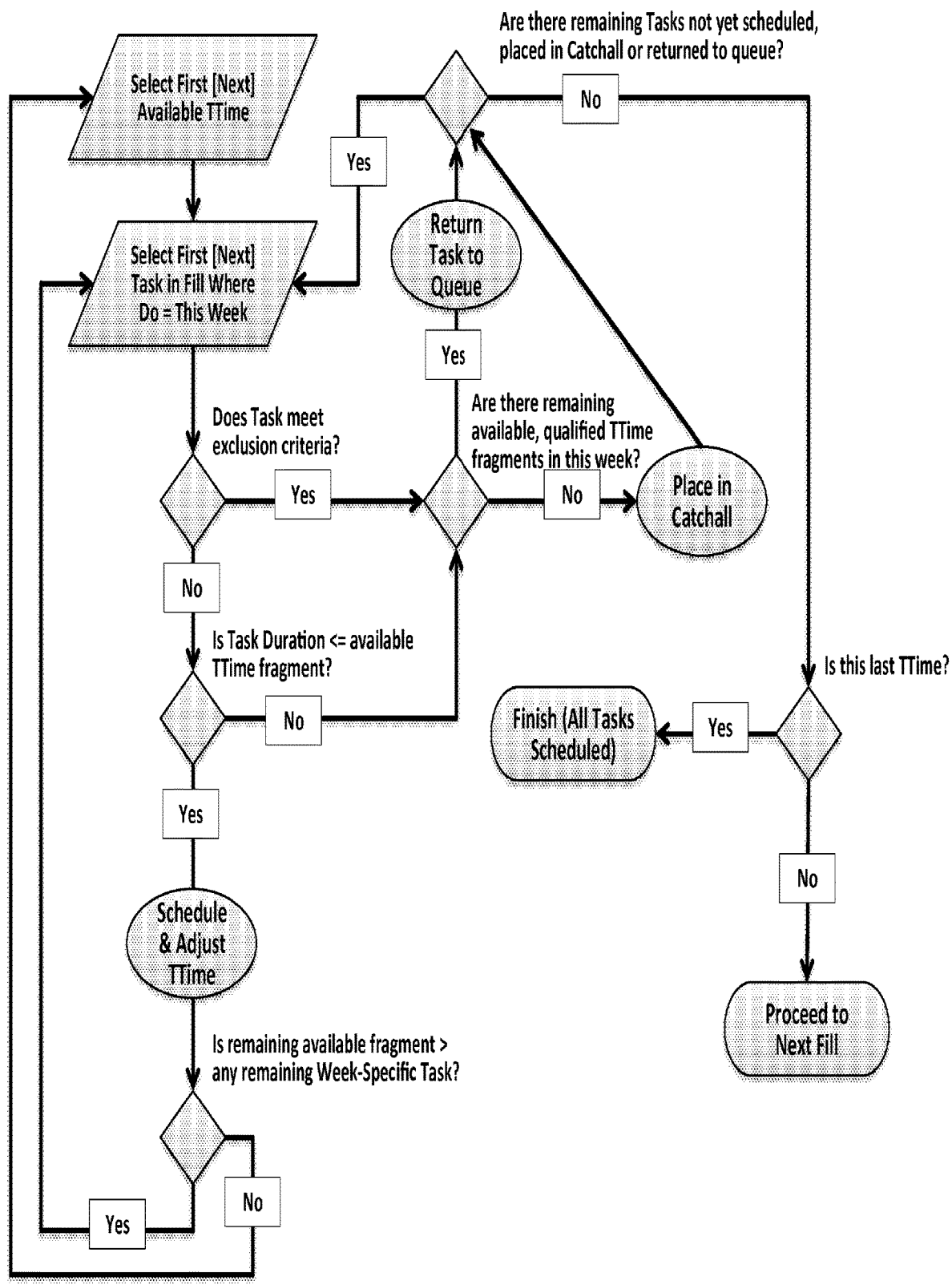
*Figure 3.6*

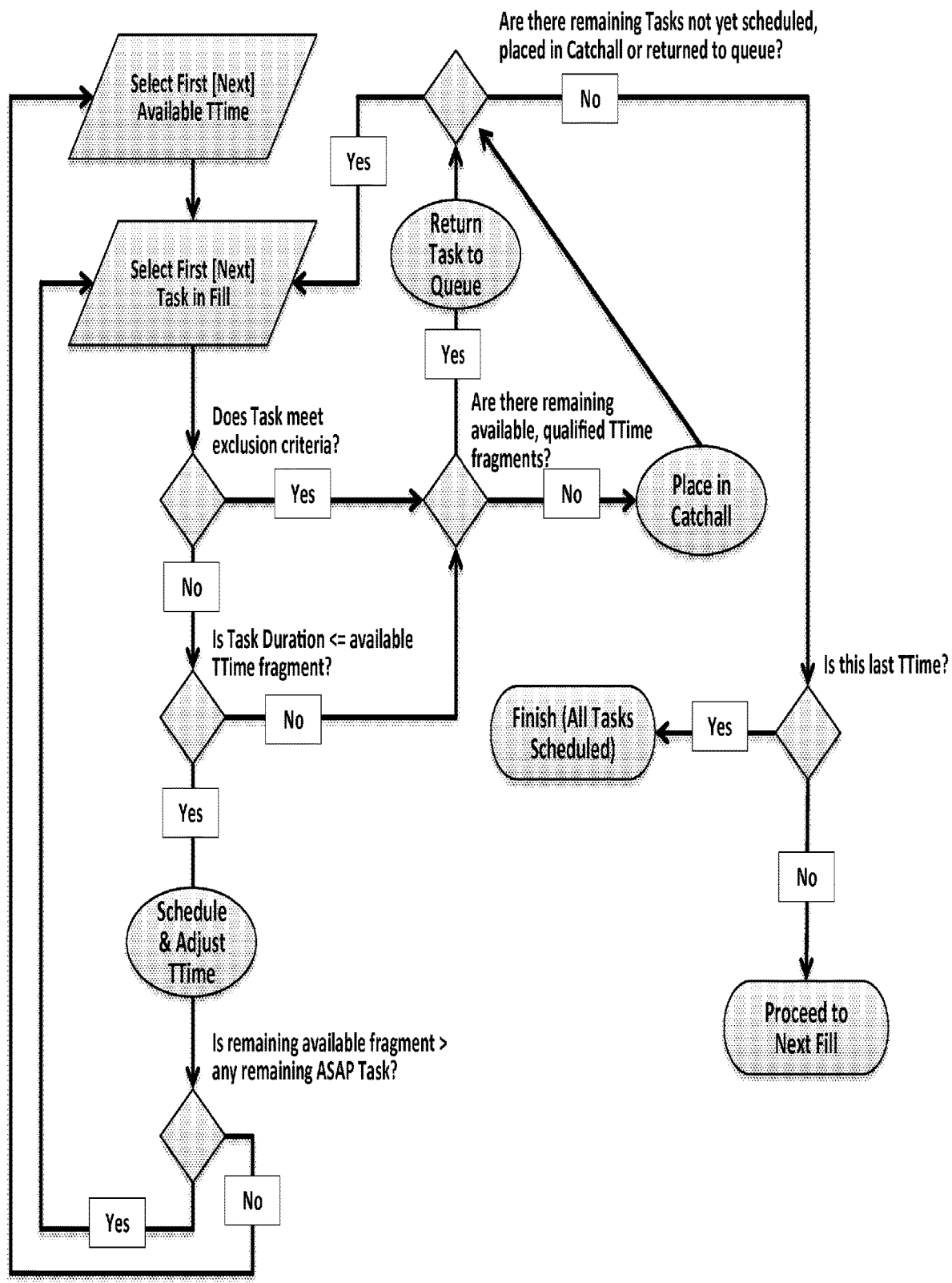
*Figure 3.7*

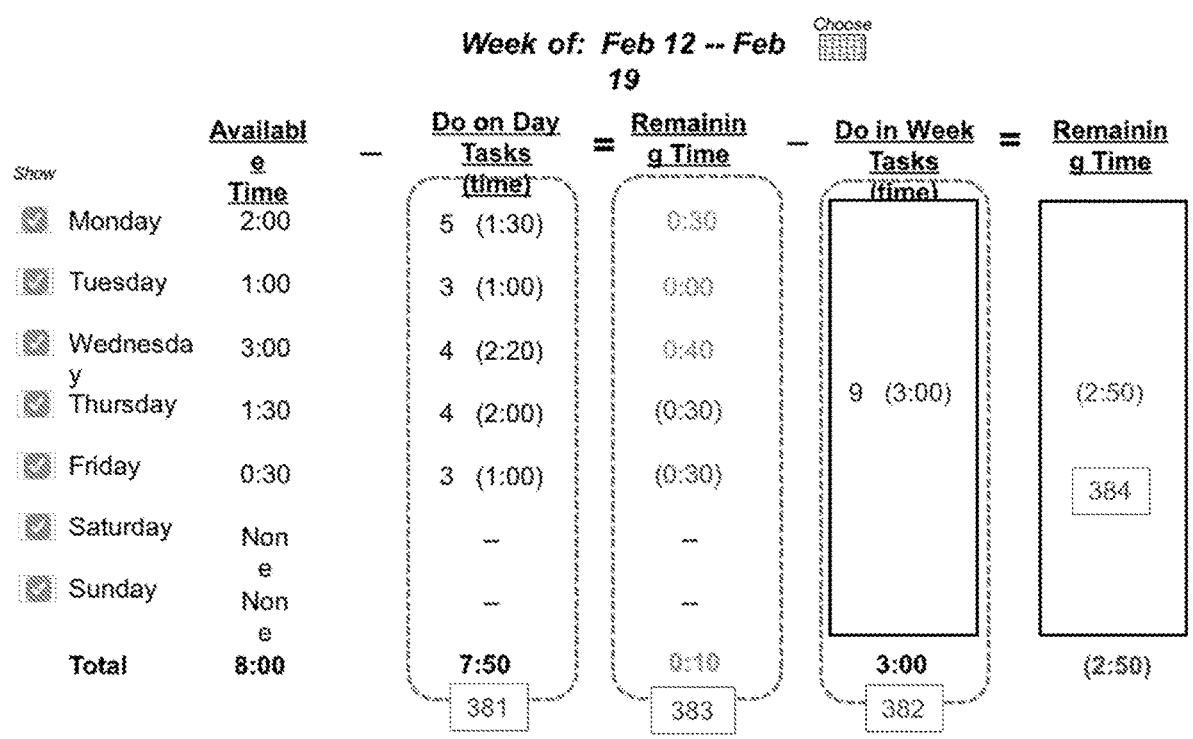
*Figure 3.8*

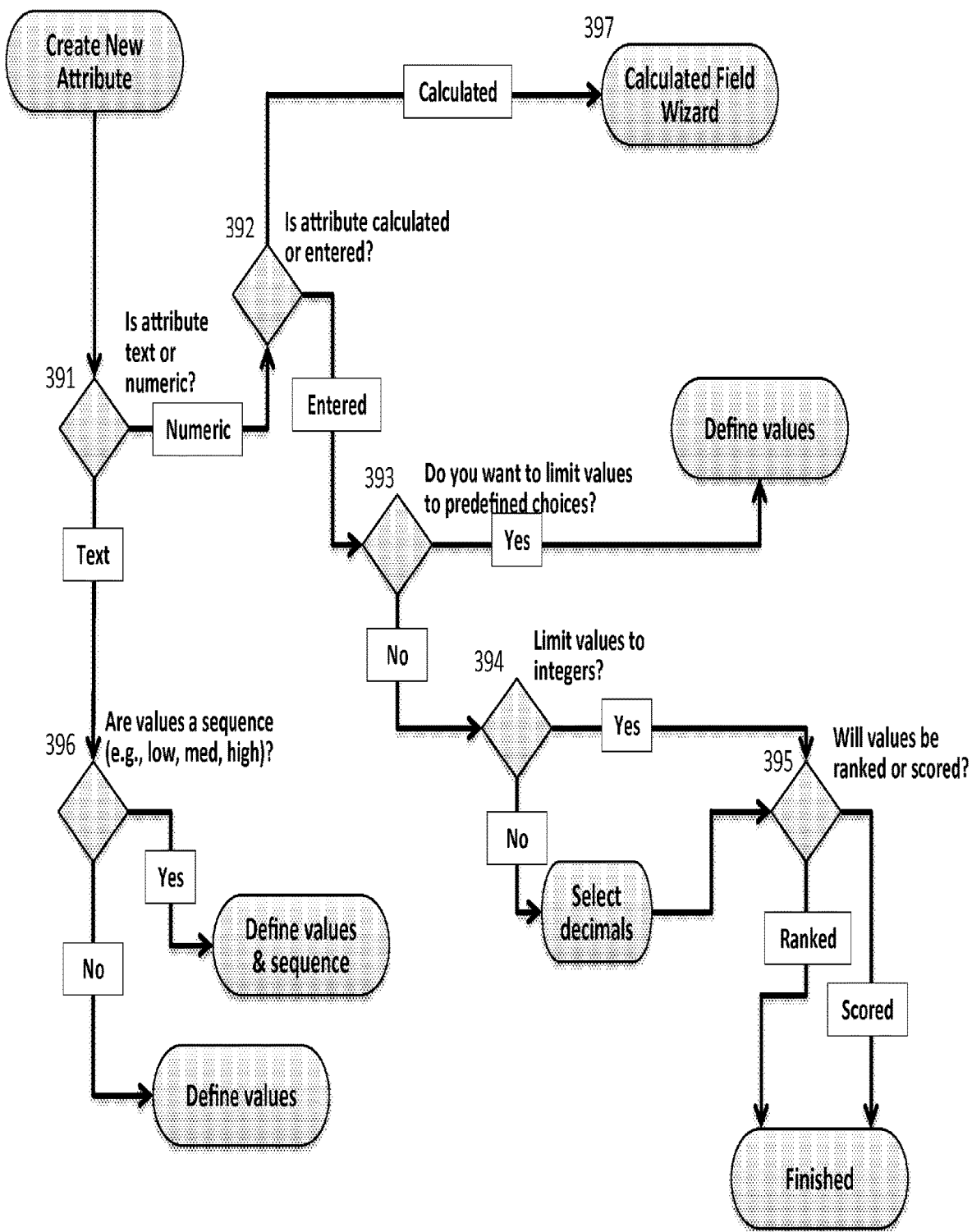
Figure 3.9

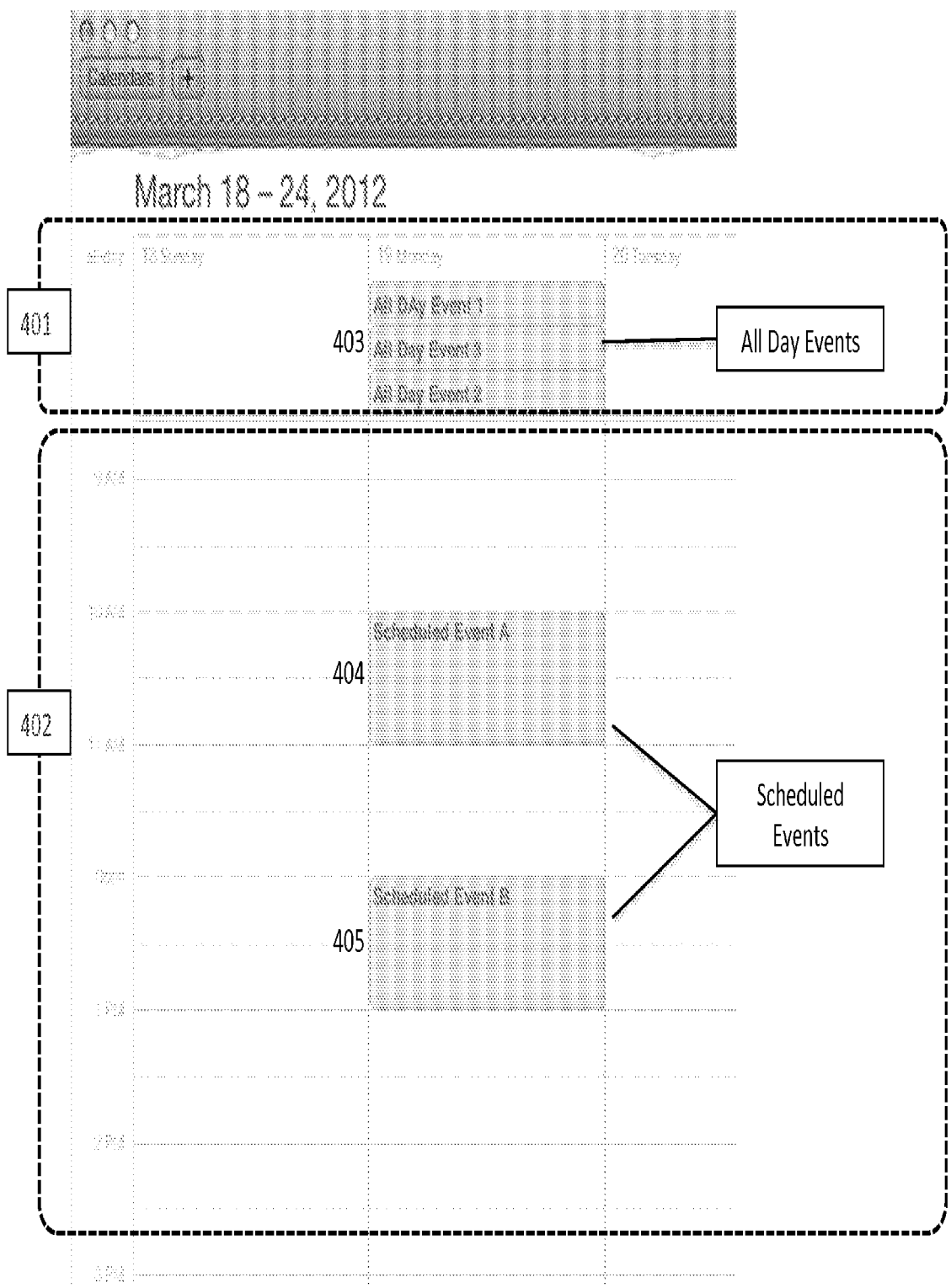
Figure 4.0

Figure 4.1
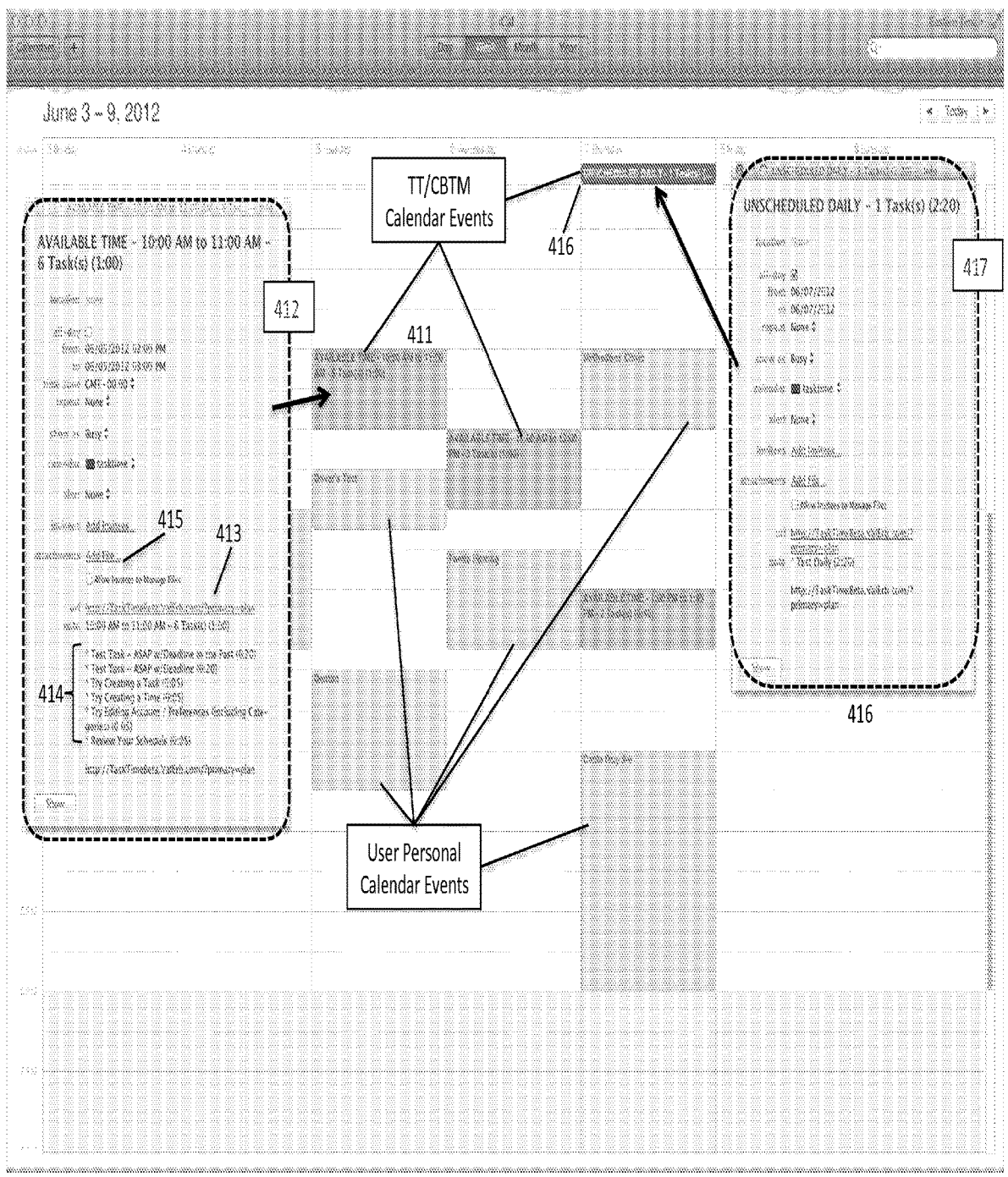

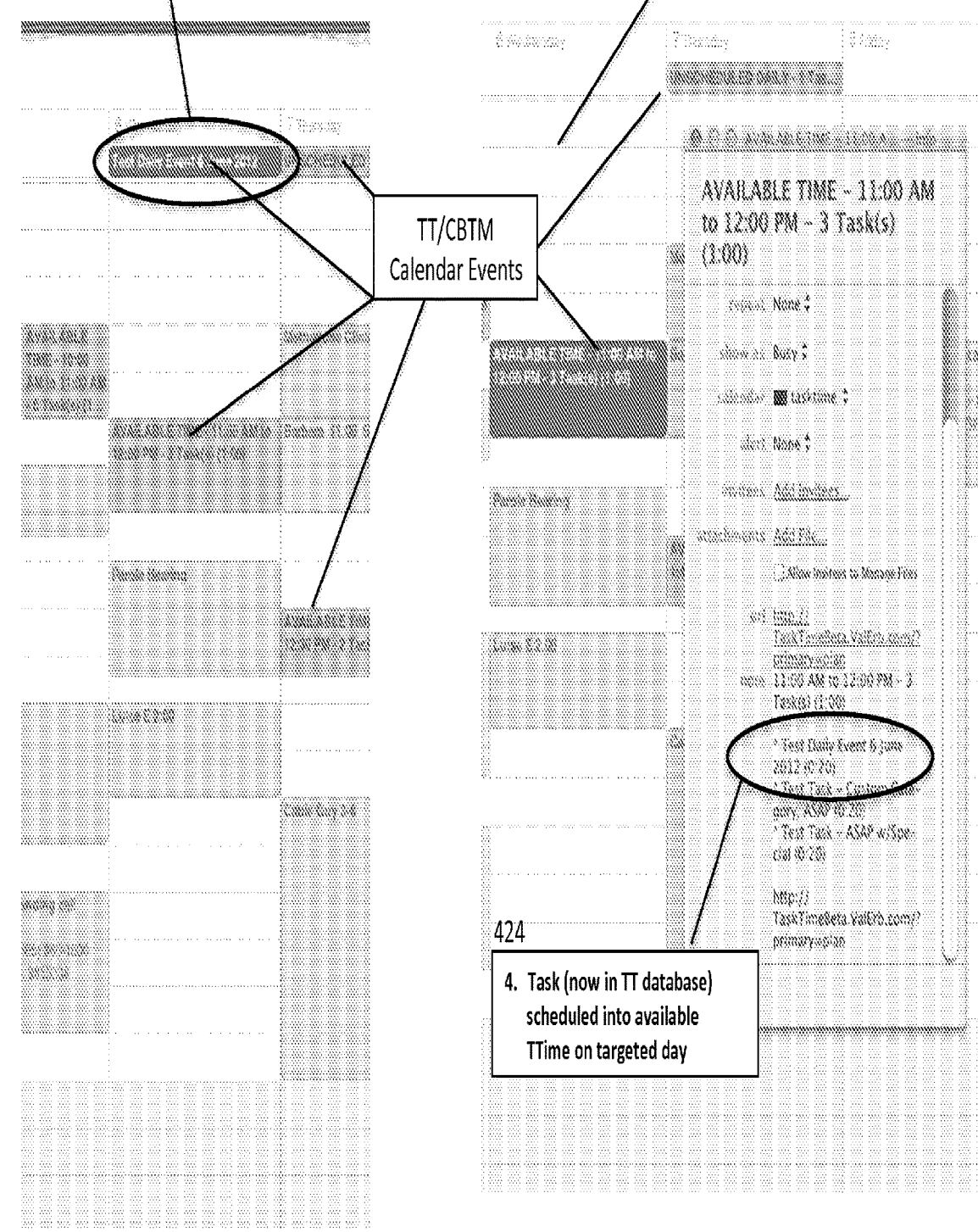
*Figure 4.2*

CALENDAR BASED TASK AND TIME MANAGEMENT SYSTEMS AND METHODS

CROSS-REFERENCE TO RELATED APPLICATIONS

This application claims priority under 35 U.S.C. § 120 as a divisional of U.S. patent application Ser. No. 15/601,927 entitled "CALENDAR BASED TASK AND TIME MANAGEMENT SYSTEMS AND METHODS" filed in the name of Caligor on May 22, 2017, which is a continuation of U.S. patent application Ser. No. 13/421,595 entitled "CALENDAR BASED TASK AND TIME MANAGEMENT SYSTEMS AND METHODS" filed in the name of Caligor on Mar. 15, 2012, which issued as U.S. Pat. No. 9,659,260 on May 23, 2017, the entirety of which is hereby incorporated by reference.

TECHNICAL FIELD

The present invention relates to electronic scheduling and managing of time and tasks. The invention comprises a software solution for (1) managing, sorting and ranking lists of tasks and (2) integrating task and time management, such that tasks can be automatically or manually assigned to specified blocks of time or periods. Users can monitor the relationship between volume of tasks and available time in which to complete them. The solution (and the method it embodies) can be applied to individual task lists as well as to the management of time across multiple projects and can be employed either by individuals or by collaborative groups. The solution and method employ multiple filters, sorts and handling rules to embody users' personal planning preferences. It can be used to manage task lists both with and without employing a scheduling component. The solution can interoperate with existing computer- and web-based calendar software and can use third-party calendar clients to display its output and to accept input from users. The solution can be used on multiple devices and via web-based application, and multiple instances can be synchronized to contain the same information.

BACKGROUND

Managing task or to-do lists is a challenge faced by millions of people daily. Solutions for managing such lists vary widely, from pencil and paper to stand-alone applications to sophisticated software tools integrated with Personal Information Managers (PIMs) such as OUTLOOK. However, these solutions fall short in several notable ways. In particular, it is difficult to (1) monitor the relationship between available time in a given day, week or month which can be applied to specific tasks (or larger projects) and the amount of time required to complete these tasks (or projects), (2) continuously prioritize, sort, rank or select tasks such that available time is used in accordance with the priorities of the user, (3) update schedules or todo lists in response to changes to a task list, to changes in available time, to changing circumstances, or to shifting user priorities. As a result, task lists often grow unmanageable, accumulating "orphan" tasks or growing to a size that ensures many items will never be completed. Furthermore, as task lists become more oversized, unruly, and populated with "orphans" (Tasks that are not completed as scheduled or for which no time is available), it often becomes difficult for a list owner to make informed decisions about which tasks to do first and which to leave. These difficulties are exacerbated by changing circumstances and priorities, which often render a plan made in the morning inappropriate by lunchtime.

The complexity of managing to-do lists increases when projects are considered. For this discussion, projects refer to larger undertakings comprising multiple tasks (often with tasks being added, removed or changed), and typically spanning long and/or open-ended periods of time. In many cases, to-do list owners will have several projects under way, potentially at different stages of completion, having different time requirements, involving different collaborators, or having different levels of urgency or priority. Projects may also comprise Tasks to be undertaken by many users, who must be able to manage their own time while coordinating with collaborators (who must also be empowered to manage their own time). In such situations, to-do list and project owners must manage available time and required tasks across multiple collaborators, across multiple projects (and their constituent tasks) and across a mix of short-term and long-term objectives, and must fit all of this into the time not scheduled for meetings, travel or other activities.

For most people, the results of all this complexity include inefficient use of time; unrealistic expectations of how much can be done in a given morning, day or week; poor prioritization as important items are left uncompleted; missed deadlines; and so on.

An additional problem with existing paper-based or software-based systems for managing ToDo lists is that they are difficult to use dynamically. While they can be used—with effort—to manage the complexity of multiple tasks, multiple projects, available time and so on, even the most diligent user will have trouble updating their planning as tasks or projects are added or removed from the list, modified, completed early or deferred or as their calendar (and thus available time) changes. When such monitoring/updating is even possible, it is so time consuming as to detract seriously from available time and is thus counter-productive.

Many of these issues apply to workplace or to teams as well as to personal planning for individuals. For example, managers often assign tasks and/or projects to their charges without clear insight into the balance between their assigned workload and available time. This can be especially problematic when more than one manager can assign tasks or projects to a single employee. Furthermore, when employees have been assigned more tasks or projects than their available time can accommodate, they often lack the perspective, information or tools to make the best possible decisions about which tasks to prioritize and which to let fall. In many cases, managers may lack sufficient information to provide guidance on these issues, leading to inefficiency and unproductive stress.

A better tool for using computers and mobile devices to dynamically manage tasks and projects—and to balance these against available time—is desirable.

SUMMARY

Calendar-Based Task/Time Management (CBTM) is a software-based system that uses computers and handheld devices to facilitate the improved management, prioritization, scheduling and tracking of tasks and projects by individuals or groups.

In the descriptions that follow, reference is made to an application embodying CBTM principles. This application, called TaskTime, is offered as an illustrative example of a CBTM solution and is not meant to represent all of its possible embodiments.

For the purposes of this description it is useful to define the manner in which several terms are used. A "Task" or "task" is an individual to-do item. Tasks may or may not be associated with a specific duration, and may or may not have a specified start time. Tasks may or may not be associated with a period of time within which they are to be undertaken. A "Time" is a specific period designated as available for undertaking Tasks. Times possess a start time and an end time, and therefore duration. To avoid confusion for the reader and to help distinguish between Times and time, Times are herein referred to as TTimes. "Events" are calendar objects—periods of time identified in a calendar application—and possess a start time and end time, and therefore duration. 'Event" may also refer to the digital record or file representing an event.

The system consists of several modules which can be combined in numerous ways, and which are variously designed to operate on computers, mobile devices, other electronic devices that may become available in the future, on private networks, and on servers reached through browsers or other means.

These modules may include (1) a task management module to manage Tasks, (2) a time management module, (3) A CBTM engine to apply rules and manage the resultant output, (4) a database containing the Tasks, TTimes, Rules and Outputs, (5) a calendar client module (either third party or special-purpose for CBTM), (6) a calendar server to provide output to internal and external calendar clients, to accept input from internal and external calendar clients, and to facilitate the exchange and synchronization of event (TTime) data, (7) a user interface (local or web based) for presentation and interactions with calendars, tasks, rules, etc., (8) a server to facilitate synchronization of user's CBTM data across devices, and (7) a conduit which allows synchronization across devices without a server.

The process embodied in CBTM software relies heavily on two key elements: Rules-based task management and rules-based scheduling.

Rules-based task management refers to the creation, management and editing of Tasks as well as the creation, storing and application of rules to filter, sort, rank and select Tasks based on assorted Task attributes.

Tasks in a CBTM database are managed using a combination of filters, which select subsets of the Task list based on various Task attributes; sorts, which order Tasks within some or all subsets on the basis of various Task attributes; and by handling rules, which apply if-then logic in order to select, order or modify Tasks. The resulting subsets are called "Fills" and can be presented individually or "stacked" in a "Cascade" such that each subset or selection is influenced by those preceding it. These subsets can also be saved as "static" lists—where items on the list remain unchanged unless added, deleted or modified. Alternatively, users may create "dynamic" lists—where inclusion or exclusion of items is based on filters and rules that can by applied on an ongoing basis.

Rules-based scheduling refers to the application of handling rules to a managed Task list such that some or all Tasks are assigned to specific TTimes, days or other periods of time. Handling rules can take many forms, but in all cases can be expressed as actionable if-then statements. Handling rules can reference Task attributes exclusively, or can reflect factors "exogenous" to the CBTM databases, such as time/date of schedule calculation or weather conditions.

CBTM Scheduling output can be presented and interacted with in several ways. An agenda view employing fixed or dynamic table layouts can be used; a calendar view can be employed; or scheduling output can also be displayed in simple list form (without regards to specific times). Additionally, lists and scheduling output can be presented within dedicated events in third party calendar clients or PIMs comingled with non-CBTM events, such that users can view all aspects of their time and task management in a single view.

CBTM can be configured and employed by users in many ways. For example, a user can compile a list of tasks, selecting them using CBTM tools, and arrive at an amount of required time. The user can then organize their day or week accordingly, with or without further recourse to CBTM. Alternatively, a user can start with an available block of time—say two hours on a given Tuesday—and compile a list of Tasks on which the time can most productively be used. Alternatively, users may choose to ignore both the calendar and Task duration aspects of CBTM, using it instead as a powerful list management tool which automatically updates their assorted special-purpose lists, informs them of Tasks which are to be done on a particular day or during a particular week, and helps them prioritize and sequence unscheduled Tasks. In each of these uses, CBTM techniques can be employed with or without the use of designated TTimes.

CBTM output can be presented to the user through a web-based application, a local application, through lists synchronized with the user's calendar client or PIM, by email or text, or by other means. The same points of user contact can in most cases be employed to allow users easy means to enter information creating or editing Tasks, TTimes, handling rules, and so on.

CBTM applications are designed to accommodate users' individual planning needs and preferences. Towards this objective, provision is made for users to define their own Task attributes, values for these attributes, and handling rules.

Figure 1:
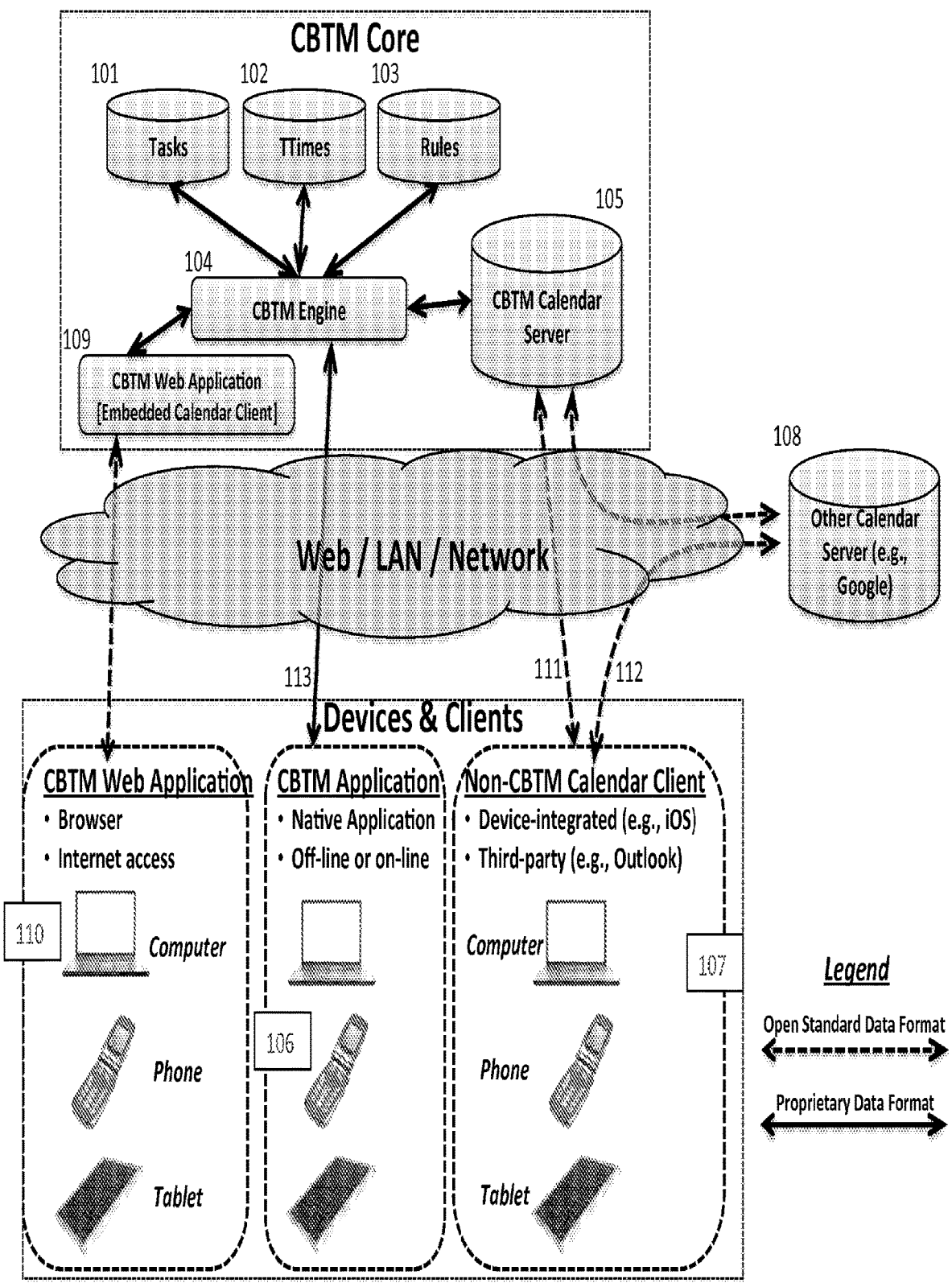
FIG. 1 describes a high-level architecture for an illustrative embodiment of a CBTM system employing network servers, computing devices, public and/or private networks and third party applications.

The CBTM Core includes databases containing records describing Tasks at 101, TTimes at 102, and rules for handling the combination of the two at 103. The CBTM core also includes the CBTM engine (104), which uses information from these databases to calculate schedules and lists. Finally, this output is exported to an iCalendar server (105) as individual events or as an entire calendar.

Output from the CBTM Core is communicated to users in any of several ways. The CBTM engine can communicate with a dedicated application on a computer, smartphone or other device (area 106). The CBTM engine can be local to that device, or communicate with it via a network. Alternatively, the CBTM Core can "publish" output in iCalendar format via it's internal calendar server (105), which in turn communicates this output to a calendar client on a device (area 107) either directly (111) or via a second calendar server (108) accessed by the calendar client (112). Output can be accessed via a web browser connecting to the CBTM web application (area 110). The CBTM core can be encompassed in a local CBTM application running in isolation on a computer, tablet, smart phone or other device (area 106), or can be accessed by such a local CBTM application connecting to the TaskTime core over a network (113).

As FIG. 1 indicates, similar paths can be followed when entering information into the CBTM core. Such information might include new Tasks, edits to existing Tasks, new TTimes, edits to existing TTimes, new handling rules or edits to existing handling rules, new exogenous factors, and so on. Information can be entered via a local application on a device (area 106), via a web-based application accessed through a browser (area 110), over a private network or by other means. Information can also be passed to the CBTM core from virtually any calendar client (area 107) in communication with the CBTM calendar server, whether such communication is direct (111) or indirect through an intermediary calendar server (112) such as a GOOGLE CALENDAR or MICROSOFT EXCHANGE server.

FIG. 2.1 depicts a form for creating and editing Tasks, which are placed into the Task database as records. In addition to typical fields such as Task Name and Description, Priority, etc., TaskTime users can assign specialized attributes to a Task. These include CBTM-related attributes used in CBTM processes: expected Task duration (212); scheduling type (defining both the specificity of scheduling to be applied and type-specific handling rules) (214); Do date (expressed as a day, week, or other period, depending on schedule type) (211); Deadline (215) (which is distinct from Do Date and can be used in several ways). A "special flag" (216) is also provided, and can be linked to free-text notes that can be searched as part of creating lists and performing queries. User-defined attributes can also be included in this form, but are not shown in this example. Different date and time fields appropriate to each schedule type are presented when that type is selected; in this example, 211 shows the input layout for a Day Task—if Day/Time is selected, an additional Time window is presented.

FIG. 2.2 depicts a form used for defining a filter within Task Manager. The specific set of Tasks satisfying the filter conditions (the output of the query) are referred to in this discussion as a "Fill." The filters defining Fills can also be used as the basis of dynamic lists, either singly or in combination. The form allows users to define a very flexible and diverse set of filtering criteria, which are similar to those described for TTime restrictions (area 231). These filter conditions are combined (as condition A AND condition B AND condition C and so on) to form specific selection criteria for inclusion in the Fill. These conditions are then applied to the Task database as a structured query. The results of a Fill query can be viewed as the Fill is being defined to provide users feedback as they refine or edit their conditions (area 232). The results of a Fill query are presented as two subsets: all Tasks satisfying the query and all remaining tasks, such that the two subsets together account for all Tasks in the superset. The second subset containing those Tasks not satisfying the Fill query is herein called a "Fill Catchall." The form also contains means for selecting primary and secondary sort criteria, which define the order in which the selected Tasks are displayed (233).

FIG. 2.3 shows several Fills "stacked" such that the Fill Catchall resulting from each Fill query forms the superset to which subsequent Fill Queries are applied. Such sequences of Fills are herein called a "Cascade." The total list of Tasks contains 71 items; the first Fill (240) defines a condition—Schedule Type=On (Day/Time) matched by none of the 71 Tasks, leaving all 71 for subsequent Fills. The second Fill (241) selects 8 Tasks, leaving 63. The third Fill (242) selects an additional 13 Tasks, leaving 50. The fourth Fill (243) selects an additional 10 Tasks. Because the fourth Fill is the final Fill in the Cascade, the remaining 40 Tasks—those not meeting any of the conditions in the Fills above—are presented in a Fill Catchall (244).

In this case, each of the first four Fills displays those Tasks falling into a specific Schedule Type; however, virtually any combination of any number of Fills can be applied in the same manner. Each Fill draws from the pool of Tasks not included in previous Fills. This remaining pool (after the final Fill query in the sequence) is always displayed at the bottom of the Cascade as a Fill Catchall (244); in this way the user can be confident all Tasks in the database are accounted for.

FIG. 2.4 depicts a form for creating and editing records describing blocks of time available for scheduling. The blocks of time made available to CBTM for scheduling are referred to as TTimes and are placed into the TTimes database as records. In addition to expected fields defining start and end date/times, description, and so on, this form contains means for applying several forms of "restriction" to a TTime, such that only Tasks with attributes satisfying these restrictions can be placed within a TTime. These restrictions can be used in a variety of combinations, and include limits on: specific categories (222); minimum and/or maximum duration of Task (223); presence of a Special flag (224); schedule type (225); priority level (221). User-defined Task attributes can also be used to create restrictions for a TTime, but are not shown in this example.

FIG. 2.5 shows a typical example of scheduling output. The left-hand column shows Tasks that have been scheduled into specific TTimes or daily/weekly Catchalls, organized by time and day in chronological order (area 251). Tasks scheduled for a specific day but for which no TTimes are available are placed in a Catchall on that day (252). The right-hand column contains all Tasks that are not currently scheduled: the upper panel displays Tasks with Do Dates in the past (area 253), while the lower panel displays ASAP Tasks that have not yet been scheduled (area 254). In this way the user can be confident all Tasks in the database are visible.

This Plan screen also provides mechanisms for "overriding" automated scheduling. Unscheduled Tasks (shown on the right) can be "placed" into a specific date on the left (255). Tasks scheduled on a particular day (shown on the left) can be "excluded" from that date or from a range of dates (256).

FIG. 3.1 depicts an overview of a typical CBTM scheduling flow; details of portions of this flow are depicted in subsequent figures. This flow is strictly illustrative, and one skilled in the art will recognize that other sequences of handling rules can easily be employed in the same manner.

The process begins with retrieval of a list of currently available TTimes (FIG. 3.2). These are retrieved, ordered chronologically, and assessed for restrictions of any type (these will be applied in later steps of the process).

The process continues with a mapping of available Time-Specific Tasks (FIG. 3.3), and the adjustment of any TTimes with which they might overlap (in the handling rules of this example, the time-specific Task supersedes all others) so that available TTime is correctly represented.

Having dealt with qualifying Time-Specific Tasks, the process moves on to other scheduled and ASAP Task types. These are filtered and sorted using a Cascade such as the illustrative example in FIG. 3.4.

The resulting Cascade contains 39 Tasks: 10 Daily Tasks to be done "today" and assigned to the "personal" category and sorted by creation date; followed by 8 Weekly Tasks to be done "this week" and assigned to the "High" priority level and sorted by Category; and so on. In this manner, 39

Tasks are selected for scheduling and rank ordered for subsequent processing. Depending on the handling rules selected, the remaining 61 will themselves be sorted and either scheduled into remaining time (after the 39 have been placed), or put into a "not scheduled" Catchall.

FIGS. 3.5-3.7, depict an illustrative continuation of the Scheduling flow, using the Cascade described above to assign Tasks to available TTimes.

FIG. 3.5 depicts the handling of the selected Daily Tasks (per the example described above, 10 Tasks fitting selection criteria).

The process then moves on to the next Fill—in this case Weekly Tasks to be done "this week" and having high priority (FIG. 3.6). The process for matching these Tasks to remaining TTimes is very similar to that of the previous Fill.

When Time-Specific, Daily and Weekly Tasks have all been scheduled or placed in a Catchall, the process repeats for ASAP Tasks (FIG. 3.7). At this point, many or all of the TTimes have been partially or completely filled. However, the CBTM application starts with the first ASAP Task in the Cascade, and steps through the Task-TTime matching process again, until each Task has been placed in a TTime or in a Catchall.

FIG. 3.8 depicts a CBTM dashboard which: summarizes total number and duration of Daily Tasks, Weekly Tasks, etc.; summarizes available TTimes for the same periods; presents the "net" between Tasks and available time within which to complete them, and so on.

FIG. 3.9 depicts an illustrative flow for defining a "custom" (user-defined) attribute. In this process users are guided via a series of questions and answers through the process of providing the information needed to define the characteristics of a custom attribute and modify the database of Tasks to include this attribute. The custom attribute can then be used in applying filters, sorts, rankings, etc. to Tasks.

FIG. 4.0 depicts a typical representation of all-day events, in this case as they are shown in iCal, APPLE's calendar client. Area 401 is a portion of the display reserved for all-day events. Three all-day events are visible on Monday March 19$^{th}$ (403)—these are associated with the date but have no presented start or end time. Area 402 shows the area reserved for time-specific or scheduled events. Two scheduled events—from 10-11 AM and from noon-1 PM are visible on Monday March 19$^{th}$ (404 and 405 respectively).

FIG. 4.1 shows TaskTime schedule data displayed alongside a user's personal calendar in an iCal (APPLE) calendar client on a personal computer. Typically, each calendar is shown in a different color—in the example in FIG. 4.1, the two sets of calendar events have been labeled for monochromatic viewing.

FIG. 4.2 shows an example of how information rules are applied to calendar synchronization; in this example a user is entering a new Task scheduled for June 6 via their calendar on a PC or phone. Typically, each calendar is shown in a different color—in the example in FIG. 4.2, the two sets of calendar events have been labeled for monochromatic viewing.

DETAILED DESCRIPTION

For the purposes of this description, "handling rules" are if-then statements employing at least one of Task attributes, TTime attributes, and exogenous factors (such as time of day, location or even weather), and taking the form "if _____, then do _____, else _____." Handling rules are stored as records in the CBTM database for later retrieval and use, and have their own unique attributes that describe how they are to be used. For instance rules can be designated as "stop here" or continue, such that the rule becomes "if _____, then do _____ then do not apply the next handling rule." Handling rules can be triggered by other handling rules, for example stating "if _____ then if _____ do _____, else _____." Sequences of handling rules can be saved and retrieved as single compilations.

In addition to specifying how a Task should be scheduled or what lists it should be added to, handling rules can be used to define conditions under which a Task should be modified and the specifics of that modification. For example, a rule might be established that breaks Tasks for which no available TTime fragments of sufficient duration remain into pieces equal to remaining fragments. In another example, a rule might be established that marks all Tasks created more than 60 days ago for deletion, or which actually deletes these Tasks.

In this description, the term "Catchall" is used in numerous contexts. The precise definition of a Catchall varies according to context, but in all cases refers to any remainder of a superset not included in subsets. For instance, a "daily Catchall" refers to the list of Tasks which are to be done on a specified day but for which no available time has been identified; a "scheduling Catchall" refers to the list of Tasks which remain unscheduled after a scheduling exercise; a "Fill Catchall" refers to all Task records in a superset not selected by a filter (Fill refers to a type of filter explained below); and so on. In all cases, however, a Catchall's purpose is to ensure that all items within a set that must be accounted for are properly tracked.

Rules-based task management refers to the creation, management and editing of Tasks as well as the creation, storing and application of rules to filter, sort, rank and select Tasks based on assorted Task attributes. While many variants of Task attributes are possible, they typically include one or more of: Subject, Notes, expected Duration, Deadline, Do Date (Do), Category, Tag, and special-purpose (application- or user-specific) attributes. Typically, each Task will also be assigned a Scheduling Type that indicates the specificity with which it must be scheduled or that indicates applicability of individual handling rules.

In some embodiments of CBTM, users can define their own "custom" attributes as well as the specific values or types of value they can contain.

Tasks are created by users, by collaborators assigning Tasks, or by applications such as project management solutions. Each Task is stored in a database (the Task Database) as a record associated with descriptive attributes such as those referenced above. Additional information is associated with each Task in the database, including an identifier for the Task "owner," creation and modification times, and other information that is useful in managing the database or presenting the features described below.

Tasks in the database can then be managed using a combination of filters, which select subsets of the Task list based on various Task attributes; sorts, which order Tasks within some or all subsets on the basis of various Task attributes; and by handling rules, which apply if-then logic in order to select, order or modify Tasks. The resulting subsets can be presented individually or "stacked" in a "Cascade" such that each subset or selection is influenced by those preceding it. These subsets can also be saved as "static" lists—where items on the list remain unchanged unless added, deleted or modified. Alternatively, users may create "dynamic" lists—where inclusion or exclusion of items is based on filters and rules that can by applied on an ongoing basis. Dynamic lists are updated when Tasks are added to or deleted from the superset of Tasks, when Task attributes are modified, when exogenous factors—such as time of day, location, weather conditions, or stock/commodity prices—change, or simply every time they are presented or referenced.

In many applications of CBTM, "Catchall" rules can be applied. In this context, a Catchall captures and presents all Tasks in a superset not assigned to a subset. The purpose of Catchalls is to ensure that all Tasks in a set are always accounted for.

Rules-based scheduling refers to the application of additional handling rules to a managed Task list such that some or all Tasks are assigned to specific TTimes, days or other periods of time.

Handling rules can take many forms, but in all cases can be expressed as actionable if-then rules. Simple examples might include: if a Task is >60 days old, exclude from scheduling; if a Task is less than 10 minutes in duration then prioritize it in the scheduling queue; if a Task contains the word "medication" then schedule immediately; and so on. Rules can be sequenced in a manner analogous to the "stacked" filters described in Task Management, such that they are applied in the order most meaningful or useful to the user.

Handling rules can reference Task attributes exclusively, or can reflect "exogenous" factors. For the purposes of this discussion, "exogenous" refers to any variable not encoded into the Task database, and generally refers to external conditions that can be referenced in making planning decisions. The most obvious exogenous variable is time/date: many of the handling rules applied in CBTM embodiments reflect consideration of time (for instance a Task may be restricted to a particular day or week, a particular time of a particular day, or a particular time of day on any available day). Less obvious examples of exogenous variables that might be included in handling rules are weather (mean, high or low temperature, forecasted probability of precipitation, etc.); economic indicators such as stock or commodity prices; location (in GPS coordinates, latitude/longitude, zipcode or city name, etc.); availability of time in others' schedules; and so on. Any item that can be expressed as a numeric or text value and rendered accessible to a CBTM application can be used as an exogenous input to a handling rule.

Handling rules can be defined as "application defaults," can be defined by users, can be defined by third parties, or can even be defined by additional handling rules. The order in which handling rules are applied can be determined algorithmically (for instance, applying rules in an order determined by the attributes of the set of Tasks to which they are to be applied), by fixed ordering rules within the application, or by the user. Sequences of handling rules can be saved and retrieved for subsequent use.

In many cases users, other individuals or other applications will designate specific periods (referred to herein as TTimes) as available to the CBTM application for scheduling. Scheduling can be undertaken with or without regard to whether an applicable TTime exists or is available (that is, rules can be applied which allow Tasks to be scheduled regardless of whether time in which to do the Tasks is available). Scheduling can be dynamic or static (that is, a schedule can be "locked down" or updated at specified intervals). Scheduling can be purely automated, performed by users based on CBTM applications' recommendations, or manual (that is, overrides of handling rules can be applied to individual Tasks, to groups of Tasks, to TTimes, or to periods of a Calendar).

Handling rules applied to scheduling may apply if-then rules or logical tests to a variety of factors, including but not limited to: time/date, attribute-based exclusions or inclusions applied to a TTime (for example limiting its availability to Tasks with specified priority levels or belonging to specified categories); prioritization of Task subsets (for instance giving precedence to Tasks scheduled for the past, or assigned to a specific category); and exogenous factors.

In many applications of CBTM scheduling, "Catchall" rules are applied. As with Task management Catchalls, the intent of scheduling Catchalls is to make sure that all items that must be accounted for are properly tracked. Schedule Catchalls can take numerous forms, including: lists of Tasks designated for scheduling at a specific time or during a specific period but for which no time is available; lists of Tasks scheduled for the past; lists of Tasks which do not satisfy currently applied handling rules; lists of Tasks that have reached a certain "age" (days since creation of the record) and so on.

Scheduling output can be presented and interacted with in several ways. An agenda view employing fixed or dynamic table layouts can be used to display TTimes and the Tasks that fall within them, as well as any associated Catchalls. Alternatively a calendar view can be employed, with Catchalls displayed in an adjacent space or listed separately. Scheduling output can also be displayed in simple list form (without regards to specific times, e.g., all Tasks for a given day). Additionally, lists and scheduling output can be presented within dedicated events in third party calendar clients or PIMs comingled with non-CBTM events, such that users can view all aspects of their time and task management in a single view.

Many powerful forms of CBTM rely on synchronization across one or more device. Tasks, TTimes, rules and outputs can be synchronized, replicated or simply presented across one or more of web-based applications, computer-based applications and applications on mobile or hand-held devices, with information exchanged through wired, wireless or other local connections or through the internet, private networks or other forms of network.

CBTM information can also be managed and synchronized across applications, whether on a single device or on multiple devices connected through a network. Such synchronization and exchange of information can be managed through "conduit" applications such as CHAPURA'S POCKETMIRROR or by means of open-standard-formatted files that serve as "middle-ware." For example, iCalendar records can be used to exchange information between a CBTM application and a user's personal calendar client (e.g., OUTLOOK, ICAL, GOOGLE CALENDAR) in .ics format. By employing this standard—recognized by a wide range of calendar applications—it is possible to enable the display and input of CBTM information by means of a user's personal calendar client or, alternatively, to manage their personal calendar from within a CBTM application. In this way, users can interact with both their personal calendars and their CBTM information through a single view, with both sets of information displayed simultaneously.

CBTM can be configured and employed by users in many ways. For example, a user can compile a list of tasks, selecting them using CBTM tools, and arrive at an amount of required time. The user can then organize their day or week accordingly, with or without further recourse to CBTM. This approach has several merits, and does not require the user to enter or track available TTimes.

Alternatively, a user can start with an available block of time—say two hours on a given Tuesday—and compile a list of Tasks on which the time can most productively be used. Again, this approach can be employed without any need to track available TTime through CBTM databases—or users can use CBTM calendaring to define the two-hour window.

Alternatively, users may choose to ignore both the calendar and Task duration aspects of CBTM, using it instead as a powerful list management tool which automatically updates their assorted special-purpose lists, informs them of Tasks which are to be done on a particular day or during a particular week, and helps them prioritize and sequence unscheduled Tasks.

In each case, CBTM output can be presented to the user through a web-based application, a local application, through lists synchronized with the user's calendar client or PIM, by email or text, or by other means. The same points of user contact can in most cases be employed to allow users easy means to enter information creating or editing Tasks, TTimes, handling rules, and so on.

CBTM is easily adaptable to a variety of time management philosophies and practices. For instance, several popular task prioritization techniques (e.g., Franklin-Covey) involve sorting tasks along two dimensions, such as: urgent vs. not urgent and important vs. not important, with different priorities and handling rules recommended for each of the four combinations. CBTM easily accommodates such distinctions, for instance allowing users to define a list for each of these four combinations, apply priorities and handling rules to each, and have all of this tracked, updated and presented dynamically without ongoing effort on their part.

In another example of the application of CBTM methodologies to time management practices, CBTM is easily adapted to the Get Things Done (GTD) approach, which is popular among professionals and executives. This approach advocates sorting tasks according to "context" or type (e.g., phone calls and emails, errands outside the home or office, and so on) and further suggests that each user define his or her own, personally meaningful set of such distinctions and establish practices for when and how to deal with each type. Such approaches are easily reflected in a user's CBTM setup, for instance by establishing a category for each task context, establishing handling rules for scheduling them, and even designating TTimes dedicated to specific contexts.

GTD—like many methodologies—also emphasizes preventing list build-up, for instance eliminating to-dos that have reached a certain "age" without being addressed, or setting "clean desktop" policies requiring users to eliminate their lowest priority to-dos when the workload is unmanageable. Again, CBTM is easily adapted to such practices, for example allowing users to filter and sort Tasks by age, and apply handling rules based on age, or on age combined with other Task attributes.

In both instances, CBTM techniques are especially well suited to helping users achieve these objectives. This adaptability to the specific planning requirements and preferences of individual users is a central design objective of CBTM.

To further enhance the adaptability—and thus the usefulness—of CBTM approaches to different time and task management techniques, custom attributes can be defined for virtually any planning need. These custom attributes can take any form that can be incorporated into a database, and can be defined by CBTM application providers, by advocates of specific planning techniques, or by individual users. Similarly, users can define and order their own handling rules to ensure that the resulting planning system reflects their priorities and preferred planning techniques. For instance, Tasks of a specific age (days since creation) can be flagged or deleted, or alternatively moved to the highest priority level.

Finally, many systems and time management specialists emphasize the importance of not committing to a greater volume of tasks than can be achieved in the available time. While this principle is straightforward in theory, it is often difficult to execute in practice. Obstacles to doing so include (1) lack of means for easily keeping running totals of existing commitments, (2) lack of means for easily keeping running totals of available times, (3) lack of means for easily determining whether a new task is "important" enough to replace an existing one, and if so which, and (4) lack of time and attention required to update these understandings dynamically as circumstances evolve. CBTM systems address all of these issues, empowering users to make the best use of their time without over-committing.

A description of an exemplary embodiment—hereafter referred to as TaskTime—illustrates a variety of CBTM principles.

TaskTime (TT) is a web-based application, meaning the primary data repository is web-based and accessed through the Internet or another network. FIG. 1 describes a high-level architecture for an illustrative embodiment of a CBTM system employing network servers, computing devices, public and/or private networks and third party applications.

The CBTM Core includes databases containing records describing Tasks at 101, TTimes at 102, and rules for handling the combination of the two at 103. The CBTM core also includes the CBTM engine (104), which uses information from these databases to calculate schedules and lists. Finally, this output is exported to an iCalendar server (105) as individual events or as an entire calendar.

Output from the CBTM Core is communicated to users in any of several ways. The CBTM engine can communicate with a dedicated application on a computer, smartphone or other device (area 106). The CBTM engine can be local to that device, or communicate with it via a network. Alternatively, the CBTM Core can "publish" output in iCalendar format via it's internal calendar server (105), which in turn communicates this output to a calendar client on a device (area 107) either directly (111) or via a second calendar server (108) accessed by the calendar client (112). Output can be accessed via a web browser connecting to the CBTM web application (area 110). The CBTM core can be encompassed in a local CBTM application running in isolation on a computer, tablet, smart phone or other device (area 106), or can be accessed by such a local CBTM application connecting to the TaskTime core over a network (113).

As FIG. 1 indicates, similar paths can be followed when entering information into the CBTM core. Such information might include new Tasks, edits to existing Tasks, new TTimes, edits to existing TTimes, new handling rules or edits to existing handling rules, new exogenous factors, and so on. Information can be entered via a local application on a device (area 106), via a web-based application accessed through a browser (area 110), over a private network or by other means. Information can also be passed to the CBTM core from virtually any calendar client (area 107) in communication with the CBTM calendar server, whether such communication is direct (111) or indirect through an intermediary calendar server (112) such as a GOOGLE CALENDAR or MICROSOFT EXCHANGE server.

The core TaskTime application is organized into six key functional areas (excluding account management, user preferences, and so on), each described in more detail below. A seventh functional area called "Additional Feature/Functions" describes important aspects of TaskTime that are not covered in the other sections of this description. The seven areas are:
- Task management
- TTime management
- Planning/Scheduling
- List management
- Dashboard
- Calendar synch
- Additional Feature/Functions In the Task management area, users create and manage Tasks and compile sequenced lists of some or all of their Tasks by creating specific requests.

From a user perspective, a Task is a discrete to-do, defined by attributes including Task Name, Duration, Do Date, Scheduling Type, Deadline, Category, Priority, Special Flag+Notes, Assigned To/By, and Completion Status. A Task may have a duration assigned to it. "Time-Specific" Tasks (labeled Day/Time in FIG. 2.1) are conventional Tasks with the addition of specified start and end times, giving them aspects in common with an event.

FIG. 2.1 depicts a form for creating Tasks in TT. While most of the Task attributes discussed in this description are self-explanatory, Scheduling Type [214 in FIG. 2.1] warrants additional explanation. TaskTime employs the application of "handling rules," which can be specific to circumstances and/or Task attributes. In TT, one type of such rule focuses on specificity of the period within which a Task must be completed. For instance a Task might be defined as do AT (a specific day/time), ON (a specific day), DURING (a specific week or other period) or ASAP (As Soon As Possible). These choices are labeled area 214 in FIG. 2.1. Such distinctions can be used not only for scheduling purposes, but also as a basis for prioritization or selection; for instance users might specify that ON Tasks always supersede DURING Tasks in scheduling, or they might limit the use of certain TTimes to Tasks of a specific Scheduling Type.

It is worth noting that AT Tasks (also referred to in TaskTime as Day/Time Tasks) are different in nature from other Scheduling Types, in that they contain specific scheduling information in their attributes. In particular, these Tasks are the only ones that have a specific start time and end time assigned to them, meaning they can be scheduled for particular times without resort to placement in a TTime. Because of this difference, AT Tasks are addressed by handling rules specific to their type, and tend to be scheduled before other types in a scheduling flow. This is illustrated in FIGS. 3.1 and 3.4, and in the "Planning/Scheduling" section below.

In premium versions of TT, users can define "custom attributes." This function is intended to allow users to define attributes needed for their own personalized task management system, or to include specialized information about Tasks in their planning. For instance, some users might define two custom attributes: Importance and Urgency, and assign a two-point scale (Low, High) or a five-point scale (Very Low, Low, Moderate, High, Very High) to each. The user can then define handling rules such as: "if Importance=High AND Urgency=High, then schedule first" and "if Importance=Low AND Urgency=Low, then delete."

FIG. 3.9 depicts an illustrative flow for defining a "custom" (user-defined) attribute. In this process users are guided via a series of questions and answers through the process of defining the characteristics of the custom attribute and of the values it may contain. When these characteristics have been established, the custom attribute can be added to the database and made available in portions of the UI which make reference to attributes, including Task creation/editing areas, TTime restriction areas, handling rules, and so on. The custom attribute can then be used in applying filters, sorts, and handling rules to Tasks.

At 391, the user is prompted to indicate whether the Attribute is text or numeric. If numeric, they are further prompted at 392 to distinguish between entered (user selected) and calculated (using a formula). At 393, the user indicates whether the attribute should accept only specified values (i.e., data validation should be applied). At 394, the user indicates whether values should be limited to integers. At 395, the user indicates if the values are to be ranked (forced to unique values) or scored (duplicate values allowed). At 396, text attributes are further separated into sequenced values (e.g., low, medium, high) or simple multiple choices (e.g., home, office, fun). At the end of this process, a database field corresponding to the custom variable is created, appended to existing and future Task records, and added to those user interface elements referencing Task attributes for input or output.

One skilled in the art will appreciate that the methods for defining such attributes and the values they might contain are myriad, and cannot all be illustrated here.

In some embodiments, calculated values are contemplated for custom attributes (FIG. 1, 397). For instance, a user might define a variable called "focus index." This value might be calculated using priority rank (low=1, high=3) multiplied by expected duration in minutes, divided by days until deadline. The resulting focus index score would favor high-priority Tasks that require the most time to complete and are to be done soonest. Because days to deadline will change over time, the values of this calculated attribute will change over time, making them especially useful in combination with dynamic lists (described below). Users can then choose to sort by such attributes, or alternatively to define one or more Fills based on threshold values for these indices.

If desired, weightings for each component of a calculated attribute can be defined in order to improve usefulness of the resulting values. For example users may choose to minimize the impact on "focus index" of duration (which might be 5 minutes or 300 minutes) when multiplying duration by priority (limited to 1, 2, or 3); in such cases the user might define the calculation as duration in minutes divided by 10 and then multiplied by priority value and divided by days until deadline.

If desired, users can create calculated attributes using text values by assigning a numeric value to each attribute value. For example, a user might define a calculated attribute called "fun score" by assigning values of 1, 5 and 10 to the categories work, home and play respectively and then multiplying these values by the duration in minutes.

Finally, calculated attributes can be based upon factors exogenous to TT, accessed through RSS fees, APIs or other means. For example, outside temperature can be included in the calculation of "fun score," or a custom attribute can be based on stock market changes in the past 24 hours. Note that while attributes based on exogenous factors share similarities with handling rules based on exogenous factors they are separate and distinct.

To facilitate fast and easy Task creation, "new task" forms are pre-populated with default values—selected by the user or set as application defaults—when opened. For instance, in FIG. 2.1 the new Task defaults are duration=20 minutes (202), category=inbox (203), scheduling type=Day (204), all other attributes=null. These attributes can be edited later, but need not be considered when a user is first creating a Task. Thus a user can enter as little information as the Task's name (a matter of seconds) and either leave the resulting task in that form or retrieve it later (by searching for category=inbox and/or a specific range of creation times). In premium versions of TT, users can define several default templates that can be applied when Tasks are created. For instance, a template called "phone call" might set category=phone call, do=This Week, duration=10 minutes.

In Manage Tasks, the user can view their entire task list and filter or sort it according to their individual needs. In its default form, Task Management presents all uncompleted Tasks on a user's list (by way of example, 100 Tasks in total), sorted by priority then creation date (other default sorts can be selected). Users can then create a specific query using any Task attribute recorded in the database.

FIG. 2.2 depicts a form for creating such a query. Users can base these queries on any attribute in the Task database, and can combine the presence or absence of attributes to create complex queries. Area 231 presents the attributes available for selection in this example, and allows users to select any combination of such attributes they choose. These conditions are then applied to the Task database as a structured query. The results of the query can be viewed as it is being defined to provide users feedback as they refine or edit their conditions (area 232). The form also contains means for selecting primary and secondary sort criteria, which define the order in which the selected Tasks are displayed (233). Such queries—from a user perspective a list of Tasks satisfying specific requirements and ordered according to specific rules, and from a database perspective the results of a structured query, sorted for presentation by specified rules—are herein referred to as "Fills."

In the TaskTime Task Manager, all Tasks from the superset not included in a Fill are presented below the Fill in a "Catchall." This ensures that all Tasks are accounted for and visible, and that none are overlooked.

Fills can be "stacked," i.e., applied sequentially. For example, users might define Fills for each of several key categories like work-related calls or high-priority errands. Each would return those tasks satisfying the filter attributes that had not been included in a previous Fill; as each new Fill is added, a new Catchall is presented at the bottom. Such a collection of stacked Fills is herein referred to as a "Cascade." A Cascade is defined as a specific sequence of Fills, which can be applied to any set of Tasks.

FIG. 2.3 depicts a Cascade as displayed in the Task Manager. The total list of Tasks contains 31 items; the first Fill (240) defines a condition: Do Date<Today, matched by 9 of the 31 Tasks, leaving all 22 for subsequent Fills. The second Fill (241) selects only 1 Task meeting it's criterion (Deadline<Today), leaving 21 Tasks. The third Fill (242) selects an additional 3 Tasks (other Tasks of Schedule type=Day/Time) from those remaining after the prior Fills. Because the third Fill is the final Fill in the Cascade, the remaining 18 Tasks—those not meeting any of the conditions in the Fills above—are presented in a Catchall (243).

Fills and Cascades are dynamic, meaning that they are continuously updated (or updated according to set rules) to reflect changes to the list of Tasks, to the attributes of the Tasks themselves, or other considerations such as time of day. Thus once a user has personalized a Cascade to—for instance—maintain lists of all phone calls and emails requiring action within 24 hours, this list is regularly updated and is always current.

Both Cascades and their constituent Fills can be saved, retrieved and edited such that a user can create a library of Cascades for specific purposes and recall them as needed.

Saved Cascades form the basis of dynamic lists, discussed below in "List Management."

Filters or Cascades can also be defined such that they reflect factors exogenous to TT, accessed through RSS fees, APIs or other means. For example, rules can be included in the creations of Cascades that prioritize different types of Task according to forecasted weather conditions. In an illustrative example, a Cascade might include a Fill that is applied only when extreme precipitation is forecast and which selects ASAP Tasks or those in a category called "some day." Alternatively, weather conditions could be excluded from selection/filtering rules but used to determine the sort order in which results are presented and/or prioritized.

One key use of Cascades is to create a rank-ordered list of Tasks, such that the rank order reflects the order in which a user would have Tasks undertaken, given a stated set of priorities.

In the TTime Management area, users create and manage TTimes.

In some CBTM applications, the ability to match tasks to designated available times is an important capability. In TT, users have the ability to create a TTime, defined in this discussion as a specific period with a start time and end time which is designated as available for the completion of Tasks.

Users can create and edit TTimes through a variety of interfaces, including a form similar to that used for Tasks (and depicted in FIG. 2.4), a calendar format where times are created and edited by clicking and dragging, and so on. In some embodiments, TTimes may be created and/or updated automatically by the CBTM application by means of accessing the user's calendar and searching for times during which nothing else is scheduled and which satisfy specified rules (for example, no more than one hour per day, and only between the hours of 10:00-12:00 AM and 2:00-4:00 PM).

FIG. 2.4 depicts a form for creating and editing TTimes—which are placed into the TTimes database. In addition to expected fields defining start and end date/times, description, and so on, this form contains means for applying several forms of "restriction" to a TTime, such that only Tasks with attributes satisfying these restrictions can be placed within a TTime. These restrictions can be used in a variety of combinations, and include limits on: specific categories (222); minimum and/or maximum duration of Task (223); presence of a Special flag (224); schedule type (225); priority level (221). For instance a TTime might have a restriction applied such that only Tasks of less than 15 minutes duration are allowed (223), or such that Tasks for which Category=Personal are excluded (222). User-defined Task attributes can also be used to create restrictions for a TTime, and are added to this form as users define them. One skilled in the art will appreciate that any attribute applied to Tasks can be used as restrictions for a TTime.

TTimes can be created in series (e.g., on the first day of every month at 11:00 AM for 10 months, or every Thursday at noon indefinitely) such that the series can be modified as a whole (for instance shifting start time or duration of each TTime in the series at once). Users may also edit individual TTimes in a series. Alternatively, users can "bulk create" TTimes. In this case, many TTimes can be created at once but each is treated as an individual TTime. Series identifiers are applied to all TTimes created in a bulk action, such that they can be identified as a group within the Task Manager for subsequent deletion or modification.

It is worth noting that TTimes are simply what their name suggests—designated "space" in a calendar, agenda or schedule. While TTimes are presented through CBTM applications as affiliated with Tasks, this affiliation is in most cases a matter of presentation only, and is not reflected in the database. A notable exception to this statement is Day/Time Tasks, which as previously mentioned possess attributes of both Tasks and TTimes.

In the Planning/Scheduling area schedules are created which map specific Tasks to specific blocks of time, specific days, or specific periods.

A central purpose of TaskTime is to serve as a powerful scheduling tool that allows users to apply complex rules or planning techniques to their lives with minimum complexity and effort. In TaskTime this is accomplished through the Plan tab, which brings together Tasks, TTimes and handling rules to continuously generate a schedule for each user. This schedule is based on a Cascade reflecting the user's planning priorities, additional handling rules applied to scheduling, and in some cases TTimes.

Because it is based on rules, the Plan tab can be refreshed at any time, and is therefore always current. For the same reason, virtually no effort is required of the user once the rules have been established and Tasks entered; their schedule of Tasks will always be current.

Note that TTimes need not be available—or even considered in the scheduling flow—for TaskTime to generate and maintain a schedule. For instance, if no TTimes are entered, users will still automatically get lists of daily and weekly Tasks on the appropriate dates in the form of Catchalls. If they wish, users can also place or include unscheduled Tasks (both "place" and "include" are explained below) into any day they choose—if no TTime is available, these too will be added to the Catchall for that day. Thus the user need not commit to entering and tracking TTimes to use TT, and can adapt TaskTime to his or her preferred style.

To the user, the Plan creation process is largely invisible; the user defines the Tasks, the TTimes and the Rules, but TaskTime combines these without the user's intervention. Similarly, Plans are updated automatically at defined intervals or according to defined triggers. In the web-based form of TT, Plans are not stored at all—rather they are recalculated every time they are presented to a user or exported to a calendar. Regardless of the method for triggering a recalculation, the result is a Plan view in tabular, agenda, calendar or other format which indicates what Tasks should be undertaken in a given time slot, on a given day, or during a given period.

The specifics of how a Plan is compiled can take many forms, depending on the intent of the CBTM application designer, the rules specified by users, and other factors. In TT, for instance, users can impact automatic scheduling through the prioritization scheme (Cascade) applied, the restrictions applied to TTimes, the use of custom attributes, and so on. In order to render the description manageable, a single example is described here. However, many types of planning flow beyond this single example are available to users of TT, and the range of possibilities in other CBTM applications is virtually limitless.

FIG. 3.1 depicts an overview of a typical CBTM scheduling flow; details of portions of this flow are depicted in subsequent FIGS. 3.1 through 3.7). This flow is strictly illustrative, and one skilled in the art will recognize that other sequences of handling rules can easily be employed in the same manner.

The process begins with retrieval of a list of currently available TTimes (FIG. 3.2). These are retrieved, ordered chronologically, and assessed for restrictions of any type (these will be applied in later steps of the process).

The process continues with a mapping of available TTime-Specific Tasks (FIG. 3.3), and the adjustment of any TTimes with which they might overlap so that available TTime is correctly represented. All Time-Specific Tasks are identified and ordered according to a defined attribute (e.g., start time) (330); if applicable, additional selection criteria such as priority or category may be applied to identify Time-Specific Tasks that will be excluded from scheduling. Each of the identified Tasks is then compared to the TTimes database (331). If the Task overlaps with a TTime (332), the TTime database is adjusted accordingly, either by removing the TTime from the list of Available TTimes if it is encompassed by the Task (333) or by replacing the TTime with any remaining "fragments" if the Task does not completely encompass it (334). The Task is then scheduled, as are all Tasks not overlapping with a TTime in the TTimes database. This process is repeated until all qualifying Time-Specific Tasks have been placed; when this process is complete, the process moves on to the next Fill or subset of Tasks to be placed in the schedule (355).

Having dealt with qualifying Time-Specific Tasks, the process moves on to other scheduled and ASAP Task types. These are filtered and sorted using a Cascade such as the illustrative example in FIG. 3.4. In this case, the Cascade employs Fills based on scheduling type and progressing from time-specific (illustrated in FIG. 3.3, above) to day-specific (341) to week-specific (342) and ultimately ASAP. Note that each Fill is filtered by additional attributes; for example, in the Cascade depicted in FIG. 3.4, only Daily Tasks which are also scheduled for "today" and are in the category "personal" are selected—all other Daily Tasks are excluded (341). Similarly, the second Fill selects only those Weekly Tasks which are to be done "this week," and whose priority is "High" (342). In this example, ASAP Tasks are filtered into two groups: High Priority regardless of category (343) and those in the category "Fun" regardless of priority (344). All Tasks not meeting these multiple selection criteria are included in the Catchall.

The resulting Cascade contains 39 Tasks: 10 Daily Tasks to be done "today" and assigned to the "personal" category and sorted by creation date (345); followed by 8 Weekly Tasks to be done "this week" and assigned to the "High" priority level and sorted by Category (346); followed by 14 Tasks to be done ASAP and having high priority, sorted by deadline (347); followed by 7 Tasks to be done ASAP and in the category "Fun" sorted by priority (348) In this manner, 39 Tasks are selected for scheduling and rank ordered for subsequent processing. Depending on the handling rules selected, the remaining 61 will themselves be sorted and either scheduled into remaining time (after the 39 have been placed), or put into a "not scheduled" Catchall.

FIGS. 3.5-3.7, depict an illustrative continuation of the Scheduling flow, using the Cascade described above to assign Tasks to available TTimes.

FIG. 3.5 depicts the handling of the selected Daily Tasks (per the example described above, 10 Tasks fitting selection criteria). At 351, the Task is compared to any exclusion criteria that have been applied to the TTime. Exclusion criteria might be based on the presence or absence of any attribute in the Task database, and are assigned to TTimes individually or systematically. At 352, the Task's duration is compared to the available TTime (after adjusting for any other Tasks that may already have been placed within it). If the Task satisfies both of these gating checks, it is scheduled, or placed into a TTime, and the TTime's remaining minutes are reduced by the duration of the Task that has been placed (353). Tasks that do not satisfy these gating checks are returned to the queue, where they will be reviewed again when the process moves on to the next TTime (354). If, when the last TTime of that day is filled (or contains less available time than the duration of all the remaining Tasks in this Fill), they are placed in a Catchall for that day (355). In this manner, the process progresses through all available TTimes and Tasks in this Fill until either all Tasks have been placed (in a TTime or Catchall) or until all available TTimes have been filled.

The process is repeated for the remaining Fills using a flow virtually identical to that described in FIG. 3.5. The only difference between these flows is the TTimes that qualify for scheduling in each case; specifically, Weekly Tasks are examined for fit with TTimes throughout the week rather than on a specific day and ASAP Tasks are examined for fit with any available TTime. To avoid repetition, these portions of the flow are not individually narrated here.

In this manner, TaskTime steps through each Fill of the Cascade, applying restrictions to TTimes and handling rules to Tasks until all Tasks have been reviewed or all available TTimes have been filled. Any Tasks remaining are placed in appropriate Catchalls.

In this illustrative example, the Tasks assigned to Catchalls—either because they did not satisfy selection criteria in the Cascade or because they did not satisfy gating criteria in the Task-TTime matching process, are simply placed in one or more Catchall category for presentation to the user. However, handling rules can easily be applied to cover such cases. For instance, TTimes can be created to accommodate all or some of the remaining Tasks, or one or more of their attributes can be modified to allow them to be scheduled, or restrictions on some or all TTimes can be removed once all prioritized Tasks had been placed. In this way, flexible control by the user extends to the treatment of every Task in their list.

Handling rules need not be limited to Tasks that are placed in Catchalls. For instance, handling rules can be established regarding the treatment of Tasks with Do dates in the past—they can be assigned new Do dates, inserted into the next available TTime, ignored, deleted, etc. In another example, Tasks whose "age" (days since creation) is >60 can be placed on a dynamic list (see below), deleted entirely, or placed into a Fill within the Cascade. All handling rules can be saved and retrieved for later use.

In this way, TaskTime automatically creates a Plan or Schedule, which maps some or all Tasks to specific TTimes or Catchalls and lists all unscheduled Tasks in one or more Catchall. This schedule can be updated each time it is viewed, at specified intervals or when a Task, TTime or Rule is added or modified.

FIG. 2.5 shows a typical example of scheduling output. The left-hand column shows Tasks that have been scheduled into specific TTimes, organized by Time and day in chronological order (area 251). Tasks scheduled for a specific day but for which no TTimes are available are placed in a Catchall on that day (252). The right-hand column contains all Tasks that are not currently scheduled: the upper panel displays Tasks with Do Dates in the past (area 253), while the lower panel displays ASAP Tasks that have not yet been scheduled (area 254). In this way the user can be confident all Tasks in the database are visible.

A purely automated system, no matter how flexible, will never exactly reflect the nuanced and complex planning agendas of a user. For this reason, it is important to provide users a means of "overriding" the automated schedule when desired. In TaskTime this is achieved by providing users with the ability to create Task-specific "Inclusions" and "Exclusions."

Using inclusions, unscheduled Tasks (shown on the right) can be "placed" into a specific date on the left (255). This action does not modify the underlying attributes (i.e., Scheduling Type, Do date) but rather establishes a temporary Do time/date that supersedes the underlying attribute. This value remains in place until the sooner of (1) the Task (or the temporary Do date) being removed or modified by the user and (2) the date into which the Task is Included moving into the past.

Tasks scheduled on a particular day (shown on the left) can be "excluded" from that date or from a range of dates (256); in such cases the Task will be placed elsewhere in the schedule or alternatively moved to one of the lists of unscheduled Tasks on the right. These overrides supersede automatic scheduling for as long they are applicable, but do not change the underlying attributes of the Task; for instance a placed Task retains it's original Do Date, and reverts to automatic scheduling on that date when the "placement" is removed or the time in which it is placed moves into the past. Exclusions can be especially useful if—for example—a user wishes to remove a Task scheduled for this week from today because of special circumstances, but would like the Task to remain slotted for this week.

These two broad functions—automated scheduling and manual overrides applied by users—are the core of the Plan area within TT.

In the List Management area, users can create, edit, manage, and publish lists.

Many CBTM implementations benefit from the ability to create and manage lists. These lists can fulfill a variety of functions and can be accessed in several ways. TaskTime Lists fall into two broad categories: "static" and "dynamic."

Static lists—as the name suggests—don't change except when a user changes them. A static list is created by selecting two or more Tasks and using the list management function to save them as a new list. Lists can be named, retrieved, edited, copied and deleted using the List Manager user interface. Edits consist of adding or removing individual Tasks or groups of Tasks. Tasks can be added to a static list from any screen showing Tasks.

Static lists are not composed of text. Rather, they are compilations of unique identifiers for individual Task records in a database; when the list is retrieved for display the Tasks associated with these unique identifiers are presented. This allows users to modify Tasks—or even mark them completed—from anywhere within the TaskTime system and see the updates immediately in all lists and views.

Users can choose to have completed Tasks remain on the list until manually removed, or to have these Tasks automatically moved to their archive of accomplished Tasks when marked complete. Users can "publish" lists in several ways, including having TaskTime post them to their calendar automatically (see Calendar Synch below), having TaskTime email them to the user, having TaskTime save them to PDF format, and so on.

Static Lists also form the basis of daily "snapshots." Snapshots are a useful way for users to keep track of the Tasks they set out to accomplish at the beginning of a day or week. Because TaskTime can update itself continuously, schedules change over time (for instance ASAP Tasks can move to new TTimes or days as their scheduled TTime moves into the past), it is both useful and satisfying to have a fixed list representing a "snapshot" of the user's scheduled Task list at a specific moment. This makes it possible for a user to move through a day or week without updating the status of Tasks until a later time when they can review the snapshot and mark some or all items completed.

Dynamic lists, in contrast, are defined not by a list of Tasks but rather by one or more Fills. Thus dynamic lists are essentially Cascade outputs defined by a saved set of Fills. Dynamic lists can be saved, renamed, added and deleted like static lists. Unlike static lists, however, dynamic lists—as the name suggests—update continuously to reflect additions, deletion or modification of Tasks, changes to the rules defining the dynamic list, and changes to contextual factors like time or date. If desired, a user can save the contents of a dynamic list as a static list so that it can later be retrieved unchanged.

For example, a Dynamic list can be defined such that it selects all Tasks of Type=Daily OR Type=weekly AND Do<2 days from now AND Do is in the future. This list will then display all Tasks that are scheduled for completion in the next two days; as time progresses or Do dates are changed, this list will automatically be kept current.

Dynamic lists can be published in much the same way as static lists, for example being posted to the user's calendar or being sent as emails when their contents have changed.

In the Dashboard area, users can see summary statistics describing their schedules. Such statistics include: the total duration of various types of Task, the total duration of available TTimes, the number of Tasks that are over a certain age, the number of tasks scheduled for the past and not completed, and so on.

A TaskTime Dashboard is depicted in sketch form in FIG. 3.8. The dashboard summarizes: total number and duration of Daily Tasks (381), Weekly Tasks (382), etc.; summarizes available TTimes for the same periods; presents the "net" between Tasks and available time within which to complete them (383), and so on. Any time remaining is shown as available for ASAP Tasks (384); remaining ASAP Tasks may also be presented with total number and/or duration. Thus users can easily monitor the balance between their commitments and the available time with which to meet these commitments, allowing them to make better decisions about their short- and longer-term planning.

In some embodiments, the dashboard may also include retrospective statistics, such as: average number per day of Tasks completed over recent months; total Tasks completed; percentage of Tasks typically not completed as scheduled; and so on.

CBTM applications can be configured to "observe and learn." In this mode, users can mark Tasks complete as they are completed (rather than after the fact), allowing TaskTime to note the accuracy of time estimates as well as patterns by category, etc. These results can also be displayed in the user's dashboard, and can serve to educate the user about how to better estimate and mange time requirements. In additional embodiments focusing on enterprise users, such metrics can be used for in-depth analysis of actual vs. planned performance and can thus be used to inform improvements in the planning and management processes to which CBTM is applied.

While Calendar Synch is not—strictly speaking—a functional area of the TaskTime user interface it is a central aspect of TaskTime and of CBTM applications in general, and warrants explication.

The reader's appreciation will be enhanced by first understanding the distinction between a calendar client, a calendar database, and a calendar server. A calendar client is an application intended to display calendar information, and to provide a means of accepting the input of new events and/or the editing or deletion of existing events. The calendar client may or may not be integrated with the underlying database containing the event data it displays. Calendar clients can typically display multiple "calendars" (data sets) drawn from multiple sources, for example the user's personal calendar database on their computer, a calendar of national holidays to which the user has "subscribed" on the internet, and their spouse's web-based personal calendar, to which they have also subscribed. Each of these data sets exists in a separate database, all of which are being presented to the user by their calendar client within a unified view. A calendar server is a public or private server accessed via network that allows users access to one or more calendar data sets over that network, said calendars being viewed in a calendar client. Web-based calendar applications such as GOOGLE CALENDAR are typically both a web-based calendar client (a web application) and an underlying database stored on a server. MICROSOFT OUTLOOK is a client application capable of creating its own local database of events but also of subscribing to other calendar databases on proprietary MICROSOFT EXCHANGE servers or on third party calendar servers.

It will further enhance the reader's appreciation of what follows to first understand the nature and structure of the data used to store and communicate calendars. Typically, events within a calendar can be stored individually as a file containing information about that single event, the user who created or owns it, and additional parameters describing the calendar or category to which the user has assigned it. Alternatively, two or more events can be stored in a single file containing the same information but multiple events, each with a unique identifier, a start and end time, and additional information. Events (the periods of time represented in a calendar) are therefore stored as event records (the data record containing all information required to describe or portray the event) either singly or collectively within individual or multiple files.

In TaskTime, Calendar Synch is the mechanism whereby TaskTime exchanges—on the user's behalf—information between the TaskTime core and one or more calendar clients or databases, either within the TaskTime system or outside of it.

As previously discussed, some CBTM scheduling techniques require users to designate specific blocks of TTime as available for Tasks. The complexities of coordinating the management of TTimes with a separate personal calendar can be daunting and may detract from the practical value of TaskTime to users. To facilitate easier coordination, TaskTime includes a mechanism for viewing and managing these events (TTimes and personal calendar events such as appointments) through a single point of interaction (a calendar client).

This mechanism can be used to convey information to or from any computer or device capable of displaying a calendar or which has calendar client capabilities, even when no TTimes have been designated. This can be achieved in several ways, including the use of designated days or timeslots as areas to display "container events" and which display in their subjects, notes or other field. "All day events" can also be employed to transport and display information. All-day events are event records which by convention are associated with a specific date (or string of days) but not with a specific time on that date. In reality, all-day events are designated as starting and ending at midnight, but by convention are displayed in a separate area of a calendar, typically above the portion that displays specific times.

FIG. 4.0 depicts a typical representation of all-day and scheduled events, in this case as they are shown in iCal, APPLE's calendar client. Area 401 is a portion of the display reserved for all-day events. Three all-day events are visible on Monday March 19$^{th}$ (403)—these are associated with the date but have no presented start or end time. Area 402 shows the area reserved for time-specific or scheduled events. Two scheduled events—from 10-11 AM and from noon-1 PM are visible on Monday March 19$^{th}$ (404 and 405 respectively).

TaskTime includes a calendar client, which is embedded within the web-based and local applications (FIGS. 1, 109 and 106 respectively). This is a typical electronic calendar client, allowing for: daily, weekly, monthly and other views; creation and editing of both time-specific events and all-day events; dragging and dropping of TTimes both to change their start times and alter their durations; setting of calendar alarms; and so on. As the term "client" suggests, this calendar acts as an input/output mechanism for the contents of the TaskTime users' database, which in this case is stored within the TaskTime core.

To facilitate display of TTimes as calendar events within users' calendar clients, TaskTime employs an open standard for storing, communicating and presenting calendar events in both the TaskTime core and users' calendar clients. The user's calendar client may be a calendar client embedded in a TaskTime application, a calendar client on a phone or PC, or a web-based calendar client such as GOOGLE CALENDAR. The open standard employed by TaskTime is called iCalendar; iCalendar is a universally accepted standard for formatting calendar records so that they can be easily exchanged between and interpreted by virtually any calendar client or server. To further facilitate this communication, TaskTime employs a widely-used server protocol called CalDAV for it's calendar server (FIG. 1, 105); CalDAV is a server protocol to which many calendar clients can connect for the exchange of calendar events in iCalendar format. Because the developers of many calendar clients have invested in making their software compatible with CalDAV, the TaskTime core can communicate with these calendar clients without any special software development or integration efforts.

In CalDAV, user events are stored in a VCALENDAR file format. These files contain one or more VEVENT components, each corresponding to a single scheduled or all-day event. Thus a VCALENDAR file can be used to store and transmit a single event or an entire calendar between many types of calendar client. Because the TaskTime calendar server employs this standard, information placed within these event files can be transmitted between calendar clients and displayed or edited with ease, and without recourse to any special adaptation, conversion or integration.

While TaskTime uses iCalendar and CalDAV, other standards could easily be employed in their stead. Whatever standard is used, the TaskTime Calendar Server allows scheduling and Task information to be exchanged freely between itself and applications with calendaring capabilities, but which might otherwise use different—and in some cases proprietary—data structures. In this way, the TaskTime calendar server acts "middle-ware" or a universal language, translating between the TaskTime core application and other applications (including but not limited to calendar clients, PIMs and other calendar servers containing event databases). This middle-ware function allows TaskTime to present its own proprietary outputs (e.g., lists of Tasks in a Catchall) in such a way that it can be accessed and viewed from virtually any calendar client on a computer, via a web browser, on a phone, on a tablet, or on other devices without any special conduits, recourse to proprietary APIs, software integration or other efforts.

For example, users of the GOOGLE CALENDAR, OUTLOOK, or APPLE iCal calendar clients can establish two-way communication between the TaskTime calendar server and their own personal calendar database as viewed in these clients. Depending on the TaskTime system administrator's preferences and other factors, this communication can enable the display of TTimes as events in the user's personal calendar, the display of user's personal calendar events in the TaskTime calendar client, or both. In this way, users can see one calendar while modifying the other and can make changes to either in a single, consolidated view. Thus a user can use the calendar user interface to which they are accustomed to create TTimes that fit into the "white space" of their personal calendars, and can see TTimes while managing their personal calendars such that they do not double book the two.

FIG. 4.1 shows TaskTime schedule data displayed alongside a user's personal calendar in an iCal (APPLE) calendar client on a personal computer. Typically, each calendar is shown in a different color—in the example in FIG. 4.1, the two sets of calendar events have been labeled for monochrome viewing. In this example, available TTimes are shown on several days, for example 10-11 AM on June 5 (411). The TTime's subject line includes the start and end time of the container event ("AVAILABLE TIME—10:00 AM to 11:00 AM") as well as the fact that it contains six Tasks totaling one hour. Area 412 is the standard iCal presentation of the contents of this event, viewed by clicking on the event. At 414 we can see specifics of the six Tasks placed in this TTime by TaskTime and communicated to iCal via this event. At 413 we are provided with a clickable link that will allow us to open TaskTime in a browser. Note also that the iCal event format supports the attachment of image, audio or other files (415)—this mechanism, combined with TaskTime's calendar synch, allows the user to easily transport related digital material to the TaskTime core and associate this material with a Task or TTime without recourse to special conduits or application-specific interfaces. Also in FIG. 4.1, a Catchall for unscheduled events is placed within the all-day portion of June 7 (416). As described elsewhere, such Catchalls display those Tasks intended for a specific day but for which no TTime is available. As with scheduled events, these Catchall container events include specifics of the enclosed Tasks—in this case one Task titled "Test Daily"—and a link to the TaskTime core in their notes field (area 417).

Note that a user's calendar does not need to have any direct interaction with the TaskTime database in order to be displayed alongside or in combination with a TaskTime calendar in a single calendar client view. In many cases, presenting events side-by-side in this way (without comingling the underlying data) will be desirable. In other cases, however, TaskTime users may desire additional features requiring deeper interaction between the contents of their calendar database and the TaskTime database. For instance, users may wish to have their TaskTime application automatically detect available time in their personal calendars and automatically enter it into the TaskTime database as available TTime(s). Regardless of the level of integration or comingling of the two data sets, the TaskTime calendar server will facilitate information exchange.

The exchange of information between TaskTime and calendar clients can be one-way ("published") or two way (synchronized or "published/subscribed"). This means that TaskTime can receive information through user entries into their personal calendar clients as well as sending schedule and plan information to these calendar clients. An obvious example is the creation by users of new TTimes, which are communicated to the TaskTime core through calendar synch and thus added to the TTimes database.

TaskTime calendar events correspond to specific periods of time—in the case of scheduled events, with specific TTimes and in the case of all-day events with a specified day—which are recognized in the same way by the user's calendar client as the user's personal calendar. In this way, TaskTime events are indistinguishable from the user's personal calendar events in format and presentation at both the client and database levels. However, the TaskTime events convey additional meaning or information above what the user's calendar contains.

This meaning is conveyed in several ways. First, the subject line of the event—always visible in calendar clients—contains text placed by TaskTime. In this case the text describes the TTime's start and end times and the number and duration of Tasks which have been scheduled into it. Second, the notes area (areas 412 and 417 in FIG. 4.1) contains information about the specific list of Tasks and their attributes. Third, the placement of the event within the calendar display (at the database level, within the data set) conveys additional information about how to interpret the event. For example, TaskTime displays daily and weekly catchalls as all-day events—the nature of the content of these records will be evident to a TaskTime user based on their placement in the calendar alone.

As the reader will see, these three ways of conveying information to users via their calendar can be reversed, such that users can convey information to TaskTime by entering or editing information in their calendars. In this "upstream" communication, the same conventions are employed to convey meaning: scheduled events' start and end times can be communicated by editing these values for the event; subject and notes fields can each be edited, and the meaning of these edits interpreted by TaskTime according to the field used; and placement within the calendar can be used to convey information about the nature of the event's contents and how they are to be interpreted by TaskTime.

In this way, TaskTime is using calendar event records both to designate actual periods of time (corresponding to TTimes) and to convey additional information beyond what the calendar databases and clients were designed to recognize. Furthermore, the calendar clients and databases are "indifferent" to the nature, substance, or even existence of this additional information, in that they have no impact on the set of Times being tracked or on how they will be presented or interpreted by users. In this sense, TaskTime is using event records as "containers" for "payloads" of additional information, whether it be embedded in the record or conveyed by placement or context.

By establishing communication rules, many less-obvious forms of information can also be conveyed by the context in which users enter information into their calendar clients; for instance, the following rules are used in TT's synchronization with users' personal calendars: (1) a new event with begin and end times is treated as a TTime, (2) a new all-day event on the current day or a day in the future is treated as a new day-specific Task on that day, (3) a new all-day event on more than one day in the present or future is treated as a week-specific Task in that week, (4) a new all-day event in the past is treated as an ASAP Task. In each case, appropriate handling rules are applied to the synchronization.

For example a new all-day event in the future (rule number (2) above) is first "ingested" from the calendar into the TaskTime core, and converted into a day-specific Task. The original calendar event is then deleted, and the new Task is added to the queues and scheduled into the Plan on the appropriate day.

FIG. 4.2 illustrates this example. In this case a user is entering a new Task scheduled for June 6 via their calendar on a PC or phone. Typically, each calendar is shown in a different color—in the example in FIG. 4.2, the TaskTime calendar events have been labeled for monochrome viewing and all other events belong to the user's personal calendar. In a first step, the user creates an all-day event in iCal—titled "Test Daily Event 6 Jun. 2012"—and assigns it to the TaskTime calendar within iCal (421). At 422, this event is detected as a new event by the TaskTime calendar server and "ingested" into TaskTime via iCalendar synch. Following the rules described above, this event is interpreted by TaskTime as a new Daily Task to be done on June $6^{th}$. Once this Task has been created the original event—no longer needed after its creation has been properly interpreted—is deleted from the calendar (423). Immediately, this new Task is placed into the Plan queue, and scheduled into an available time on the $6^{th}$ as intended by the user (424).

In this example, information is conveyed not only by the contents of the container event (in this case the name of the event entered into the subject line), but by the placement or context of the event (in this case as an all-day even on June 6, indicating a daily task for that day).

It is understood that rules and conventions other than those described above and manifested in the present TaskTime embodiment are easily created and applied, and that this set of examples is purely illustrative.

Calendar events can convey informational payloads in many ways. For example, TaskTime places within each calendar event (in text form, in the notes field) the list of Tasks currently assigned to the corresponding TTime, information about the Tasks such as duration and category, and so on. Similarly, the "Subject" field can be used to transfer and display text describing (for instance) the number of Tasks contained therein, their total duration, their attributes, and so on. This text can also be used to describe restrictions placed on the TTime represented by the calendar event or other attributes of the TTime. Finally, URLs can be embedded in the text notes as clickable links, or alternatively placed in dedicated "URL fields" recognized by many iCalendar clients. By using calendar events as containers in this way, information can be displayed in the calendar of any phone, tablet, computer, web-based application or other application containing calendar client functionality while keeping the information contained in these events completely sequestered from the contents of users' personal calendars.

In a logical extension of this "container" concept, information unrelated to CBTM—or tangentially related to CBTM—can be conveyed via open-standard formatted files. For instance, a wide variety of information types can be encoded in one or more fields of an iCalendar or other open-standard format record—in fact, some calendar clients explicitly support attachment of files to events. This technique can be used to convey information between instances of a single application on separate devices, between multiple applications on separate devices, or between multiple applications on a single device. Such payload material might include images, video or audio, links to references, or other forms of digital content. Examples include: items to add to a shopping list stored in the notes field of a TaskTime Task;

a map of the route to a supermarket attached to the same Task; or an address or password a user wishes to note for later use.

Furthermore, information of many types can be conveyed via the notes or metadata fields of each calendar event. For example, "machine-readable" content such as API calls, database identifiers, etc. can be contained in such records, such that large amounts of information can be efficiently stored in an event in forms not intended for human consumption. In another example, variables for handling rules—or entire handling rules—can be communicated as payloads within these events; such rules or other instructions can thus be passed to the TaskTime core through any internet-connectable calendar client. For instance, a user (or third party application) might use event attributes entered through a calendar client to encode threshold levels of a Task attribute qualifying for inclusion in a TTime. In another example, TaskTime applications designed to work locally on phones or computers can use container events as a convenient means of conveying data payloads (e.g., cascade rules) between the local instance of the TaskTime application and the TaskTime core. In this way, both users and their applications can communicate via any device connected to a network or capable of connecting to a network, without additional effort, software integration or network integration.

As previously stated, the calendar events exchanged through the TaskTime calendar server are being used as "containers" for the information they convey. That is, the contents of these event records (for example, Task lists) are completely independent of the events themselves (i.e., of their start and end times), and the specific attributes of the events are unrelated to the information they convey. For example, a TTime may remain unchanged in terms of start time, end time, and all other attributes while it's contents—in this case the list of Tasks assigned by the Scheduling module to this particular TTime—may be modified repeatedly over time. In this way, calendar events as containers for information are fundamentally different than individual Tasks entered into a calendar or PIM application as event or task records possessing their own start and end times.

The notion of using calendar events—or other open standard file formats—as containers for information contained within their text and metadata fields and of using their "external" attributes (placement, duration, etc.) to signal additional information is a unique aspect of CBTM systems.

ADDITIONAL FEATURE/FUNCTIONS: Several other aspects of the TaskTime application warrant mention in this description, yet cannot be easily classified in any of the functional areas described above. Many of these aspects relate to the use of TaskTime (or another CBTM embodiment) by groups, teams or communities. These include:

Enterprise/Team capabilities: as mentioned above, TaskTime is designed to enable and support several forms of collaboration between team members or groups.

A key enabler of enterprise functions is the ability for a user to assign Tasks to another or to have Tasks assigned to them. When person A assigns a task to person B, it appears in both of their lists. In such cases, one of two additional attributes is displayed for this Task: Assigned By or Assigned To. All attributes of assigned Tasks are visible to both users, with each user having the ability to edit selected attributes. Which attributes are editable by which user can be set as an application default, determined by the person assigning the Task or established by other means. For example, Person A might be allowed to set the Subject and Deadline attributes, while attributes such as priority, Scheduling Type, Do Date, and other factors influencing sorting might be editable only by person B. Both might have editing privileges for informational attributes such as notes or special comments, and use these as a means of communicating. Similarly, not all attributes of an assigned Task would be visible to both parties. For instance, person B's assignment of priority or Do Date might not be visible to person A, but the completion status might be visible to person A. Similarly, person A might or might not be allowed visibility into the schedule of person B, into the Tasks assigned to them by others, into the amount of available time, and so on.

In an extension of CBTM principles to team environments, enterprise customers might be given additional types of handling rules to enable routing of assigned tasks between multiple assignees ("assignment handling rules"). For instance, records describing skill sets for each team member can be added to the data schema such that Tasks can be assigned according to the match between keywords, categories, tags or other Task attributes and specific skill sets of individuals. Similarly, the system might be configured to support assignment handling rules that reflect team members' available time, or seniority, or any other attribute that can be made available to the system. Finally, exogenous variables such as time, weather conditions, or location might be factored into assignment handling rules.

Packaged cascades and scheduling rule sets: It is anticipated that while some users will appreciate the flexibility and power of customized cascades, customized handling rules and even customized attributes, others will be daunted by the complexity or time demands of establishing such a system.

It is therefore anticipated that TaskTime will include the ability to provide users with "canned" cascades, rule sets and even specialized attributes (collectively, "canned packages"). These will be added to the libraries of each user via an administrative function. Such canned packages might be distributed to some or all users at intervals, either for free or on a charged basis. In the event that a canned package requires custom attributes, attribute values, feeds of exogenous data or other elements not universally included in all users' versions of TT, these will be "distributed" by the same administrative function, and the users' data structures modified accordingly.

This same mechanism can be used as the foundation of "white label" or customized group offerings. For instance, adherents of previously mentioned time management approaches (such as the Franklin Covey or GTD systems) might be offered versions of TaskTime that come preconfigured with custom attributes that support those systems, as well as with handling rules that employ these special attributes or otherwise manifest the practices of a particular system. Such white label offerings can be marketed exclusively in partnership with the authors of the system, and distributed exclusively to their adherents.

Community/Crowd-sourced packages: The same capabilities and infrastructure required to distribute canned packages can also be used to allow users to share their own systems in the form of canned packages distributed to others.

The mechanisms for such sharing can take many forms, with or without the involvement of TaskTime administrators. For instance, users might be encouraged to publish their personalized packages for the use of others. "Leader boards," prizes and other forms of incentive might be provided to encourage users to compete in creating and sharing better and better systems over time. The "owners" of such systems might even be allowed to charge other users for access to these systems.

Expanded project management capabilities: TaskTime is neither a project management tool nor a simple list manager, but embodies aspects of both. In some contexts, enhanced project management capabilities will be a critical ingredient to the successful use of CBTM by groups or individuals. These capabilities might include the ability to reflect dependencies between Tasks; to "schedule back" from a final outcome to an initial Task in a sequence so an appropriate start date for the sequence can be calculated; ability to monitor anticipated completion dates for individual Tasks or sequences of Tasks; and so on.

Similarly, a hierarchical structure for Tasks may be desirable in a project management context. For instance, it is standard practice to break Tasks into constituent sub-tasks with or without dependencies, and even to decompose such sub-tasks further in multiple iterations. In such cases, CBTM applications will benefit from ability to track sub-tasks in context of associated other sub-tasks, such that handling rules reflecting their role in the larger project can be properly implemented.

While the present invention has been described in conjunction with specific embodiments, those of normal skill in the art will appreciate the modifications and variations can be made without departing from the scope and the spirit of the present invention. Such modifications and variations are envisioned to be within the scope of the appended claims.

What is claimed:

1. An improved iterative computer-implemented method for continuously organizing and affiliating a plurality of task records with time records according to handling rules for output to one of an interface and a user device, the method performed exclusively on a computing device having access to a communications network, the computing device further having the interface for receiving data inputs from at least one of the user device and the communications network, the computing device further having a processor for executing a plurality of stored special-purpose processing instructions encoding the method in a computer-based data structure format, the computer-implemented method comprising:
   receiving, from at least one of the user input device and the communications network via the interface, data representing the plurality of task records, each of the task records having at least one corresponding task attribute;
   electronically storing a superset of the task records with their at least one corresponding task attributes in a database in a memory of the computing device;
   creating in the database time records corresponding to periods of time defined by at least two of: a specific start time, a specific end time and a duration of time;
   electronically maintaining in a memory of the computing device at least one handling rule comprising at least one trigger condition and at least one corresponding action for dynamically affiliating task records with time records;
   continuously monitoring trigger conditions, by the processor;
   when a trigger condition is met, performing a corresponding action; and
   providing an output to at least one of one of the interface and a display of the user device, which indicates to a user a result of the corresponding action.

2. The method of claim 1, where a task is affiliated with a specific time in at least one of the task record, the time record, a separate record in the database, and algorithmically according to rules defined in the special-purpose processing instructions.

3. The method of claim 1, where a task from at least one of a structured query task set and a remainder task set is affiliated with a time.

4. The method of claim 1, where a time record is restricted to task records possessing specific task attributes such that only those task records having those specific task attributes can be affiliated with the time record.

5. The method of claim 4, where the time record is restricted based on exogenous factor data.

6. The method of claim 1, where a task record can be affiliated with or excluded from a time record in response to an input from the user device.

7. The method of claim 1, wherein the action includes at least one of:
   creating affiliations of task records with time records, removing affiliations of task records with time records, modifying affiliations of task records with time records, modifying existing time records, creating new time records, deleting existing time records, modifying task records to facilitate affiliation with time records, and creating task records.

8. The method of claim 1, where the trigger condition comprises at least one of:
   received data inputs from the user input device, received data inputs from the communications network, modifications to a calendar, passage of a specified period of time, and exogenous factor data.

* * * * *